(12) United States Patent
Wu

(10) Patent No.: US 12,542,481 B2
(45) Date of Patent: Feb. 3, 2026

(54) METHOD AND DEVICE OF CONTROLLING POWER SUPPLY CIRCUIT, NON-VOLATILE READABLE STORAGE MEDIUM, AND ELECTRONIC DEVICE

(71) Applicant: SUZHOU METABRAIN INTELLIGENT TECHNOLOGY CO., LTD., Jiangsu (CN)

(72) Inventor: Mingwei Wu, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/876,139

(22) PCT Filed: Dec. 18, 2023

(86) PCT No.: PCT/CN2023/139592
§ 371 (c)(1),
(2) Date: Dec. 17, 2024

(87) PCT Pub. No.: WO2024/149028
PCT Pub. Date: Jul. 18, 2024

(65) Prior Publication Data
US 2025/0323566 A1 Oct. 16, 2025

(30) Foreign Application Priority Data
Jan. 9, 2023 (CN) .......................... 202310030518.9

(51) Int. Cl.
*H02M 1/32* (2007.01)
*H02M 1/42* (2007.01)
(Continued)

(52) U.S. Cl.
CPC ............ *H02M 1/32* (2013.01); *H02M 1/4208* (2013.01); *H02M 1/44* (2013.01); *H02M 3/33507* (2013.01)

(58) Field of Classification Search
CPC ........ H02M 1/32; H02M 1/4208; H02M 1/44; H02M 3/33507
See application file for complete search history.

(56) References Cited

U.S. PATENT DOCUMENTS 7,471,069 B2    12/2008  Kusafuka et al.
10,498,223 B1 *  12/2019  Chan .................... H02M 1/4208
(Continued)

FOREIGN PATENT DOCUMENTS

CN         1918778 A     2/2007
CN       103166442 A     6/2013
(Continued)

OTHER PUBLICATIONS

CN Search report issued for CN Patent Application No. 202310030518.9 (1 of 2).
(Continued)

*Primary Examiner* — Rafael O De Leon Domenech
(74) *Attorney, Agent, or Firm* — Merchant & Gould P.C.

(57) ABSTRACT

Embodiments of the present disclosure provide a method and a device of controlling a power supply circuit, a non-volatile readable storage medium, and an electronic device. The method of controlling a power supply circuit includes: detecting whether a voltage value of an input voltage of the power supply circuit drops; when detecting that the voltage value of the input voltage drops, determining a target drop percentage of a current voltage value of the input voltage relative to a normal voltage value of the input voltage after the voltage value of the input voltage drops and a first duration in which the voltage value of the input voltage is at
(Continued)

the current voltage value; judging whether the target drop percentage and the first duration meet a preset voltage sag judgment condition; and when judging that the target drop percentage and the first duration meet the preset voltage sag judgment condition, determining that the input voltage of the power supply circuit undergoes a voltage sag, and performing a target protection operation on the power supply circuit.

20 Claims, 12 Drawing Sheets

(51) Int. Cl.
*H02M 1/44* (2007.01)
*H02M 3/335* (2006.01)

(56) References Cited

U.S. PATENT DOCUMENTS

| | | | |
|---|---|---|---|
| 2016/0126854 A1 | 5/2016 | Yuasa et al. | |
| 2020/0343811 A1* | 10/2020 | Xiang | H02M 1/12 |
| 2022/0149722 A1* | 5/2022 | Endo | H02M 1/0025 |
| 2023/0327447 A1* | 10/2023 | Ahn | H02J 7/0047 |

FOREIGN PATENT DOCUMENTS

| | | |
|---|---|---|
| CN | 104332989 A | 2/2015 |
| CN | 109946505 A | 6/2019 |
| CN | 111371314 A | 7/2020 |
| CN | 113258760 A | 8/2021 |
| CN | 115765422 A | 3/2023 |
| WO | 2012157257 A1 | 11/2012 |
| WO | 2024149028 A1 | 7/2024 |

OTHER PUBLICATIONS

CN Search report issued for CN Patent Application No. 202310030518.9 (2 of 2).
International Search Report and Written Opinion issued for International Patent Application No. PCT/CN2023/139592 mailed Feb. 27, 2024, with English translation of Search Report.
Chinese Office Action received for CN Application No. 202310030518.9 on Mar. 14, 2023, 17 pgs.
Chinese Office Action received for CN Application No. 202310030518.9 on Apr. 5, 2023, 17 pgs.
Chinese Decision to Grant received for CN Application No. 202310030518.9 on Jun. 30, 2023, 2 pgs.

* cited by examiner

Voltage sag

Bulk capacitor of the power
factor correction stage

METHOD AND DEVICE OF CONTROLLING POWER SUPPLY CIRCUIT, NON-VOLATILE READABLE STORAGE MEDIUM, AND ELECTRONIC DEVICE

CROSS-REFERENCE TO RELATED APPLICATION

The present application is a National Stage Application of PCT International Application No.: PCT/CN2023/139592 filed on Dec. 18, 2023, which claims priority to Chinese Patent Application 202310030518.9, filed in the China National Intellectual Property Administration on Jan. 9, 2023, the disclosure of which is incorporated herein by reference in its entirety.

TECHNICAL FIELD

Embodiments of the present disclosure relate to the field of computers, and particularly to a method and a device of controlling a power supply circuit, a non-volatile readable storage medium, and an electronic device.

BACKGROUND

An input voltage sag means that at a given frequency (50-60 Hz), an alternating current voltage drops and then returns to normal after a short duration of half a cycle of the alternating current to 1 minute. The voltage sag is often caused by power supply system faults, such as a heavy startup load (e.g., starting up a large air-conditioning apparatus for the first time), remote power apparatus troubleshooting, and startup of large-scale motors in industrial plants, which may all result in a significant voltage drop. In addition, power supply apparatus short-circuiting factors (e.g., trees coming into contact with overhead cables as they grow, cable damage, or electrical equipment malfunctions in excavation works, etc.) or weather factors (e.g., tripping of aerial cables due to a lightning stroke, etc.) may also result in a voltage sag.

The input voltage sag imposes a great impact on an apparatus which is powered by the input voltage. For example, in an application scenario of a server, the input voltage sag often affects a power supply unit of the server, which may result in loss of information stored in the server in a minor case, or failure of the server to start up due to damage in a severe case. In such cases, the server has been off line from the system, which causes losses, and the server cannot be on line again until an operation and maintenance worker replaces the power supply unit of the damaged server.

With respect to the technical problem that the input voltage sag may result in apparatus damage in the related art, no effective solution has been proposed yet.

SUMMARY

Embodiments of the present disclosure provide a method and a device of controlling a power supply circuit, a non-volatile readable storage medium, and an electronic device, to at least solve the problem that an input voltage sag may result in apparatus damage in the related art.

According to an embodiment of the present disclosure, there is provided a method of controlling a power supply circuit, wherein the method includes: detecting whether a voltage value of an input voltage of the power supply circuit drops, wherein the power supply circuit is configured to supply power to a target apparatus and includes an electromagnetic interference filter, a rectifier bridge, and a power factor correction stage, an input end of the electromagnetic interference filter is connected with an alternating current power supply that provides an alternating current for the power supply circuit, an output end of the electromagnetic interference filter is connected with an input end of the rectifier bridge, an output end of the rectifier bridge is connected with an input end of the power factor correction stage, an output end of the power factor correction stage is connected with the target apparatus, and the input voltage of the power supply circuit is a voltage of the alternating current provided by the alternating current power supply; when detecting that the voltage value of the input voltage drops, determining a target drop percentage of a current voltage value of the input voltage relative to a normal voltage value of the input voltage after the voltage value of the input voltage drops and a first duration in which the voltage value of the input voltage is at the current voltage value; judging whether the target drop percentage and the first duration meet a preset voltage sag judgment condition; and when judging that the target drop percentage and the first duration meet the preset voltage sag judgment condition, determining that the input voltage of the power supply circuit undergoes a voltage sag, and performing a target protection operation on the power supply circuit, wherein the target protection operation is used to control an output voltage supplied by the power supply circuit to the target apparatus to be less than or equal to a preset target voltage value when the input voltage of the power supply circuit undergoes the voltage sag; and the output voltage supplied to the target apparatus is a voltage outputted by the output end of the power factor correction stage.

In an example embodiment, judging whether the target drop percentage and the first duration meet the preset voltage sag judgment condition includes: judging that the target drop percentage and the first duration meet the preset voltage sag judgment condition when the first duration is less than or equal to a first preset duration and the target drop percentage is greater than or equal to a first preset percentage; and/or judging that the target drop percentage and the first duration meet the preset voltage sag judgment condition when the first duration is greater than a second preset duration and the target drop percentage is greater than or equal to a second preset percentage, wherein the second preset duration is greater than the first preset duration, and the second preset percentage is less than the first preset percentage.

In an example embodiment, judging that the target drop percentage and the first duration meet the preset voltage sag judgment condition when the first duration is less than or equal to the first preset duration and the target drop percentage is greater than or equal to the first preset percentage includes: judging that the target drop percentage and the first duration meet the preset voltage sag judgment condition when the first duration is less than or equal to the first preset duration and the target drop percentage is greater than or equal to the first preset percentage, wherein the voltage value of the input voltage is a voltage value of the alternating current inputted to the power supply circuit, a value range of the first preset duration is [half a cycle of the alternating current, a cycle of the alternating current], and a value range of the first preset percentage is [90%, 99%], [90%, 95%], or [95%, 99%].

In an example embodiment, judging that the target drop percentage and the first duration meet the preset voltage sag judgment condition when the first duration is greater than the second preset duration and the target drop percentage is greater than or equal to the second preset percentage includes: judging that the target drop percentage and the first duration meet the preset voltage sag judgment condition when the first duration is greater than the second preset duration and the target drop percentage is greater than or equal to the second preset percentage, wherein the voltage value of the input voltage is a voltage value of the alternating current inputted to the power supply circuit, a value range of the second preset duration is [half a cycle of the alternating current, two cycles of the alternating current], and a value range of the second preset percentage is [20%, 40%], [20%, 30%], or [30%, 40%].

In an example embodiment, determining the target drop percentage of the current voltage value relative to the normal voltage value after the input voltage drops includes: acquiring a voltage difference between the current voltage value and the normal voltage value; and determining the target drop percentage to be equal to a ratio of the voltage difference to the normal voltage value.

In an example embodiment, performing the target protection operation on the power supply circuit includes: adjusting a duty cycle of a control signal of the output voltage in the power supply circuit such that the output voltage is less than or equal to the preset target voltage value.

In an example embodiment, adjusting the duty cycle of the control signal of the output voltage in the power supply circuit such that the output voltage is less than or equal to the preset target voltage value includes: adjusting the duty cycle of the control signal to be less than or equal to a target duty cycle, such that the output voltage is less than or equal to the preset target voltage value, wherein the target duty cycle is a duty cycle determined according to the target voltage value and the current voltage value.

In an example embodiment, the method further includes: determining the target duty cycle through the following formula: $D=1-V1/V2$, wherein V1 represents the current voltage value, and V2 represents the target voltage value.

In an example embodiment, adjusting the duty cycle of the control signal to be less than or equal to the target duty cycle includes: inputting a target pulse-width modulation signal as a driving signal to a switch device in the power supply circuit, such that the duty cycle of the control signal outputted by the switch device is adjusted to be less than or equal to the target duty cycle, wherein the target pulse-width modulation signal is used to control the switch device to switch on or off.

In an example embodiment, when determining that the input voltage of the power supply circuit undergoes the voltage sag, the method further includes: acquiring current values of a reverse recovery current of the power supply circuit in a plurality of cycles of the alternating current, wherein the voltage value of the input voltage is the voltage value of the alternating current inputted to the power supply circuit; judging whether the current values of the reverse recovery current in the plurality of cycles meet a preset current abnormity judging condition; and determining that the input current of the power supply circuit is abnormal when the current values of the reverse recovery current in the plurality of cycles meet the current abnormity judging condition.

In an example embodiment, judging whether the current values of the reverse recovery current in the plurality of cycles meet the preset current abnormity judging condition includes: judging whether all the current values of the reverse recovery current in successive N cycles of the alternating current are less than a first preset current value, wherein N is a positive integer greater than or equal to 2, the first preset current value is A times of a normal current value of a working current of the power supply circuit, A is a positive number greater than 1, and the plurality of cycles include the N cycles; and judging that the current values of the reverse recovery current in the plurality of cycles meet the current abnormity judging condition when not all the current values of the reverse recovery current in the N cycles are less than the first preset current value.

In an example embodiment, judging whether the current values of the reverse recovery current in the plurality of cycles meet the preset current abnormity judging condition further includes: judging whether all the current values of the reverse recovery current in successive M cycles after the N cycles are less than a second preset current value when all the current values of the reverse recovery current in the N cycles are less than the first preset current value, wherein M is a positive integer greater than or equal to 2, the second preset current value is B times of the normal current value of the working current of the power supply circuit, B is a positive number greater than 1, B is less than A, and the plurality of cycles include the N cycles and the M cycles; and judging that the current values of the reverse recovery current in the plurality of cycles meet the current abnormity judging condition when not all the current values of the reverse recovery current in the M cycles are less than the second preset current value.

In an example embodiment, judging whether the current values of the reverse recovery current in the plurality of cycles meet the preset current abnormity judging condition further includes: judging whether all the current values of the reverse recovery current in successive P cycles after the M cycles are less than a third preset current value when all the current values of the reverse recovery current in the M cycles are less than the second preset current value, wherein P is a positive integer greater than or equal to 2, the third preset current value is C times of the normal current value of the working current of the power supply circuit, C is a positive number greater than 1, C is less than B, and the plurality of cycles include the N cycles, the M cycles and the P cycles; and judging that the current values of the reverse recovery current in the plurality of cycles meet the current abnormity judging condition when not all the current values of the reverse recovery current in the P cycles are less than the third preset current value. In an example embodiment, a value range of A is [2.5, 3.5], [2.5, 3], or [3, 3.5]; a value range of B is [1.5, 2.4], [1.5, 2], or [2, 2.4]; and a value range of C is (1, 1.4], (1, 1.1], or [1.1, 1.4].

According to another embodiment of the present disclosure, there is provided a device of controlling a power supply circuit, wherein the device includes: an input voltage detection module configured to acquire a voltage value of an input voltage of the power supply circuit, wherein the power supply circuit is configured to supply power to a target apparatus; and a control module configured to, when detecting that the voltage value of the input voltage of the power supply circuit drops, determine a target drop percentage of a current voltage value of the input voltage relative to a normal voltage value of the input voltage after the voltage value of the input voltage drops, and a first duration in which the voltage value of the input voltage is at the current voltage value, judge whether the target drop percentage and the first duration-meet a preset voltage sag judgment condition, and when judging that the target drop percentage and the first duration meet the preset voltage sag judgment condition, determine that the input voltage of the power supply circuit undergoes a voltage sag, and perform a target protection operation on the power supply circuit, wherein the target protection operation is used to control an output voltage supplied by the power supply circuit to the target apparatus to be less than or equal to a preset target voltage value when the input voltage of the power supply circuit undergoes the voltage sag.

In an example embodiment, the control module is a processing device configured to judge whether the target drop percentage and the first duration meet the preset voltage sag judgment condition by performing the following operations: judging that the target drop percentage and the first duration meet the preset voltage sag judgment condition when the first duration is less than or equal to a first preset duration and the target drop percentage is greater than or equal to a first preset percentage; and/or judging that the target drop percentage and the first duration meet the preset voltage sag judgment condition when the first duration is greater than a second preset duration and the target drop percentage is greater than or equal to a second preset percentage, wherein the second preset duration is greater than the first preset duration, and the second preset percentage is less than the first preset percentage.

In an example embodiment, the device further includes the power supply circuit, wherein the power supply circuit includes a switch device configured to output a control signal; the control module is connected with the power supply circuit, and configured to perform the target protection operation on the power supply circuit by performing the following operations: inputting a target pulse-width modulation signal as a driving signal to the switch device in the power supply circuit, such that a duty cycle of the control signal outputted by the switch device is adjusted to be less than or equal to a target duty cycle, wherein the target pulse-width modulation signal is used to control the switch device to switch on or off, and the duty cycle of the control signal is used to cause the output voltage to be less than or equal to the preset target voltage value; the power supply circuit includes an electromagnetic interference filter, a rectifier bridge, and a power factor correction stage, an input end of the electromagnetic interference filter is connected with an alternating current power supply that provides an alternating current for the power supply circuit, an output end of the electromagnetic interference filter is connected with an input end of the rectifier bridge, an output end of the rectifier bridge is connected with an input end of the power factor correction stage, an output end of the power factor correction stage is connected with the target apparatus, and the switch device is in the power factor correction stage; and the input voltage of the power supply circuit is a voltage of the alternating current provided by the alternating current power supply, and the output voltage supplied to the target apparatus is a voltage outputted by the output end of the power factor correction stage.

In an example embodiment, the device further includes an input current detection module configured to acquire current values of a reverse recovery current of the power supply circuit in a plurality of cycles of the alternating current when determining that the input voltage of the power supply circuit undergoes the voltage sag, wherein the voltage value of the input voltage is a voltage value of the alternating current inputted to the power supply circuit; and the control module is further configured to judge whether the current values of the reverse recovery current in the plurality of cycles meet a preset current abnormity judging condition, and determine that the input current of the power supply circuit is abnormal when the current values of the reverse recovery current in the plurality of cycles meet the current abnormity judging condition.

According to still another embodiment of the present disclosure, there is provided a device of controlling a power supply circuit, wherein the device includes: a detection module configured to detect whether a voltage value of an input voltage of the power supply circuit drops, wherein the power supply circuit is configured to supply power to a target apparatus and includes an electromagnetic interference filter, a rectifier bridge, and a power factor correction stage, an input end of the electromagnetic interference filter is connected with an alternating current power supply that provides an alternating current for the power supply circuit, an output end of the electromagnetic interference filter is connected with an input end of the rectifier bridge, an output end of the rectifier bridge is connected with an input end of the power factor correction stage, an output end of the power factor correction stage is connected with the target apparatus, and the input voltage of the power supply circuit is a voltage of the alternating current provided by the alternating current power supply; a first determination module configured to, when detecting that the voltage value of the input voltage drops, determine a target drop percentage of a current voltage value of the input voltage relative to a normal voltage value of the input voltage after the voltage value of the input voltage drops, and a first duration in which the voltage value of the input voltage is at the current voltage value; a first judgment module configured to judge whether the target drop percentage and the first duration meet a preset voltage sag judgment condition; and an execution module configured to, when judging that the target drop percentage and the first duration meet the preset voltage sag judgment condition, determine that the input voltage of the power supply circuit undergoes a voltage sag, and perform a target protection operation on the power supply circuit, wherein the target protection operation is used to control an output voltage supplied by the power supply circuit to the target apparatus to be less than or equal to a preset target voltage value when the input voltage of the power supply circuit undergoes the voltage sag, and the output voltage supplied to the target apparatus is a voltage outputted by the output end of the power factor correction stage.

According to still another embodiment of the present disclosure, there is provided a non-volatile readable storage medium storing a computer program therein, wherein the computer program is configured to perform the operations in any of the above method embodiments when executed.

According to still another embodiment of the present disclosure, there is provided an electronic device comprising a memory and a processor, wherein the memory stores a computer program, and the processor is configured to run the computer program to perform the operations in any of the above method embodiments.

Through the embodiments of the present disclosure, in the process of supplying power to an apparatus by the power supply circuit, whether a voltage sag occurs may be judged in real time based on the detected drop percentage of the input voltage of the power supply circuit and the duration in which the input voltage of the power supply circuit is at the voltage value after the drop, and when the voltage sag occurs, the voltage outputted by the power supply circuit to the apparatus may be controlled at a safe voltage value, to prevent the output voltage of the power supply circuit from exceeding a working voltage range of the apparatus when the input voltage sag of the power supply circuit, which may result in damage of the apparatus. As such, the problem that the input voltage sag may result in apparatus damage may be solved, and the apparatus damage resulting from the input voltage sag may be reduced.

DETAILED DESCRIPTION OF THE EMBODIMENTS

Embodiments of the present disclosure will be described in detail with reference to the drawings and in combination with the examples hereinafter.

It should be noted that the terms "first", "second", and the like in the description of the embodiments, the claims, and the drawings of the present disclosure and the above drawings are used to distinguish between similar objects, and are not necessarily used to describe a specific sequence or sequential order.

Figure 1:
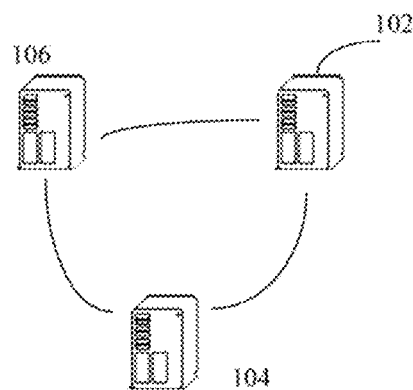
FIG. 1 is a schematic diagram of a server network architecture according to an embodiment of the present disclosure.

FIG. 1 is a schematic diagram of a server network architecture according to an embodiment of the present disclosure. This embodiment of the present disclosure is operable on the network architecture shown in FIG. 1. As shown in FIG. 1, the network architecture includes a server 102, a server 104, and a server 106.

Figure 2:
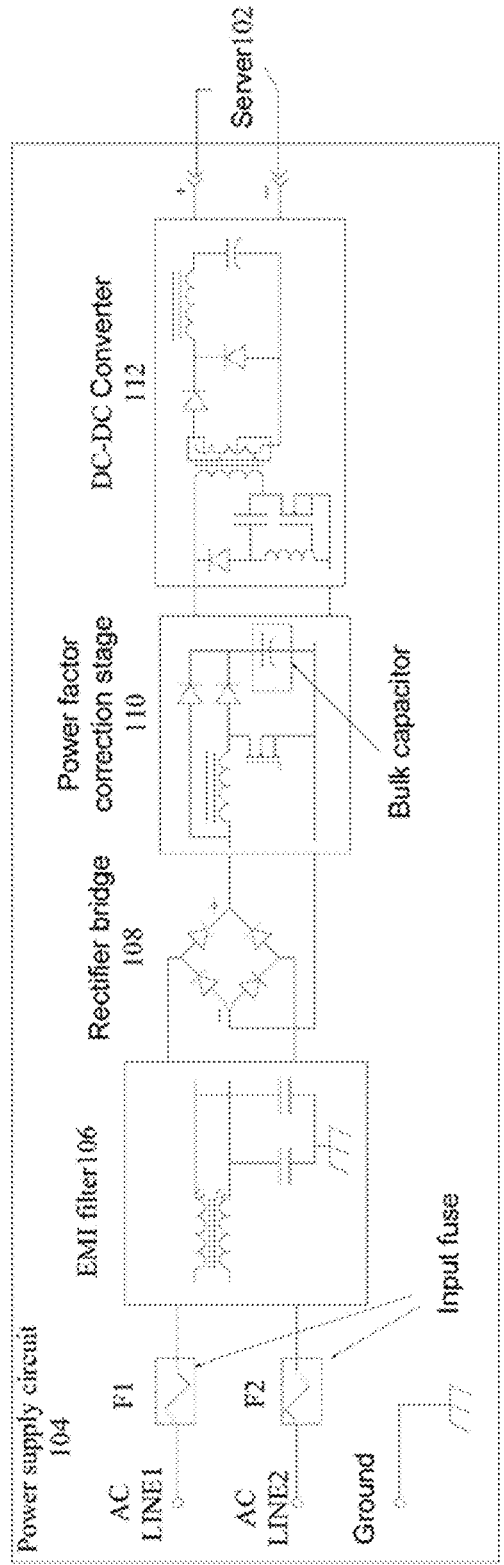
FIG. 2 is a schematic diagram of an application scenario of a method of controlling a power supply circuit according to an embodiment of the present disclosure.

An application scenario of a method of controlling a power supply circuit in the embodiments of the present disclosure may be illustrated using, but not limited to, an example that the server 102 acts as the target apparatus mentioned above. FIG. 2 is a schematic diagram of an application scenario of a method of controlling a power supply circuit according to an embodiment of the present disclosure. As shown in FIG. 2, the power supply circuit 104 that supplies power to the server 102 includes an electromagnetic interference (EMI) filter 106, a rectifier bridge 108, a power factor correction (PFC) stage 110, and a direct current-direct current converter (DC-DC) converter 112, wherein alternating current (AC) LINE1 and AC LINE2 provide an input voltage for the power supply circuit 104, and F1 and F2 are input fuses.

The power factor correction stage 110 is a power supply input stage mainly functions to make phases of a voltage and a current the same and make a load approximately resistive. Power factors of many electrical products are very low due to their internal impedance properties. To improve the power factor of the electrical product, a power factor correction circuit needs be added to a power supply input end. The power factor correction circuit may be classified into two types according to components used therein, i.e., passive and active power factor correctors. Even in a best condition, the passive power factor corrector may only achieve a power factor (PF) value of 70%, which is inapplicable to a standard of a strict power factor requirement. To achieve a PF value greater than 85% over an entire voltage range (90 V to 265 V) and when both light and heavy loads, the active power factor corrector is a necessary option. An active power factor correction stage mostly is a boost topology.

Figure 3:
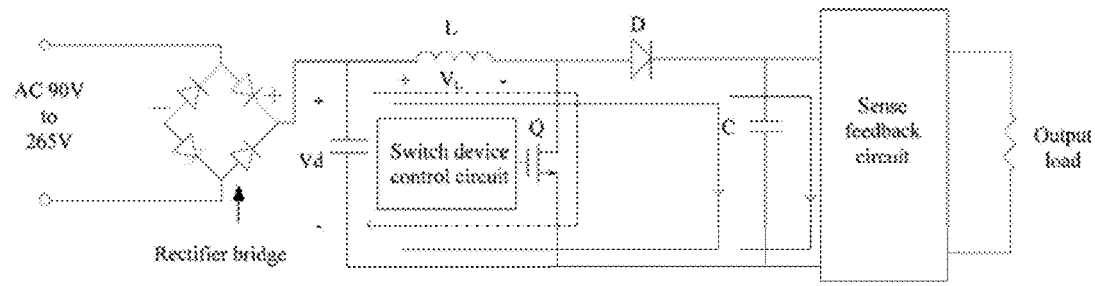
FIG. 3 is a block diagram of a boost topology of an active power factor correction stage according to an embodiment of the present disclosure.
Figure 4A:
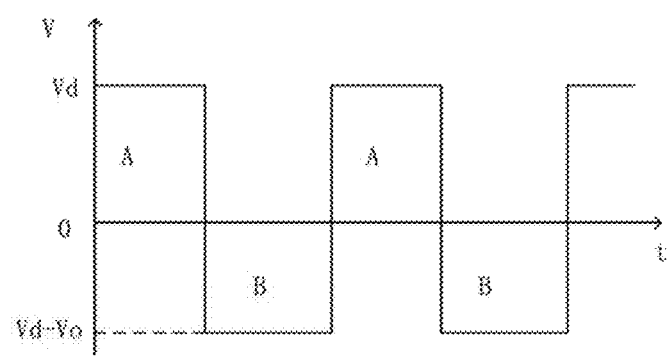
FIG. 4(a) is a diagram I of an inductor action waveform of a boost circuit according to an embodiment of the present disclosure.
Figure 4B:
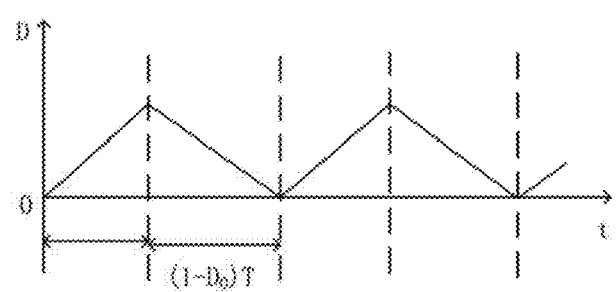
FIG. 4(b) is a diagram II of an inductor action waveform of the boost circuit according to an embodiment of the present disclosure.

FIG. 3 is a block diagram of the boost topology of the active power factor correction stage according to an embodiment of the present disclosure. As shown in FIG. 3, a boost circuit of the active power factor correction stage includes a rectifier bridge, an inductor L of the power factor correction stage, a diode D of the power factor correction stage, a switch device Q (which may be, but is not limited to, a metal-oxide-semiconductor (MOS) field-effect transistor) of the power factor correction stage, an output capacitor C of the power factor correction stage, a switch device control circuit PFC LC of the power factor correction stage, a sense feedback circuit (power&feed back stage) of the power factor correction stage, and Load RL (output load). An input voltage may be, but is not limited to, an AC voltage of 90 V to 265 V, and a direct current voltage of 127 V to 375 V may be present at a Vd (output voltage of the rectifier bridge) point. An output voltage Vo of the power factor correction stage is raised to a direct current voltage of 400 V by the boost circuit. FIG. 4(a) is a diagram I of an inductor action waveform of the boost circuit according to an embodiment of the present disclosure. As shown in FIG. 4(a), the horizontal coordinate represents time t and the vertical coordinate represents a voltage value V. FIG. 4(b) is a diagram II of an inductor action waveform of the boost circuit according to an embodiment of the present disclosure. As shown in FIG. 4(b), the horizontal coordinate represents time t and the vertical coordinate represents a duty cycle D. The duty cycle D may be, but is not limited to, equal to a ratio of A to (A+B). With reference to FIGS. 3, 4(a), and 4(b), a working process of the boost circuit of the active power factor correction stage is illustrated as follows: when Q is on, a voltage (voltage outputted by the rectifier bridge) on the inductor L is VL=Vd. At this time, Vd, the inductor L, and Q form a circuit, wherein Vd charges the inductor L, and the circuit is shown by the dashed line arrow in FIG. 3. FIG. 4(b) is a diagram II of an inductor action waveform of the boost circuit according to an embodiment of the present disclosure. As shown in FIG. 4(b), at this time, an inductor current ζL ramps up at the same rate, and when Q is off, a working cycle (DOT) ends. When Q is off, the voltage of the inductor L is phase-inverted and added to Vd, to start discharge toward an output end through the diode D. At this time, the capacitor C is in a charging state, and RL maintains an output Vo, wherein a magnitude of Vo is a value of the input voltage Vd plus the inductor voltage (-VL) (as the inductor voltage is phase-inverted, -VL is a positive value), and a circuit in this case is shown by the solid line arrow in FIG. 3. When Q is on again, a working cycle ends (i.e., a time period (1-D0)T ends).

Figure 5:
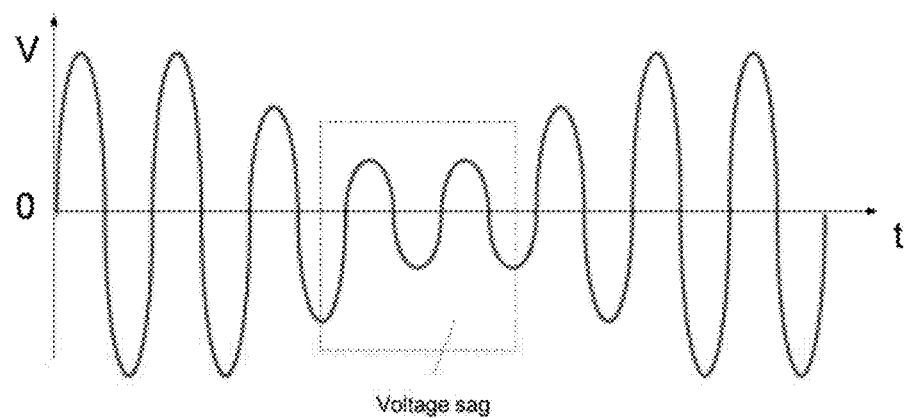
FIG. 5 is a schematic diagram of a waveform of a voltage sag according to an embodiment of the present disclosure.

When the input voltage of the power supply circuit 104 undergoes a voltage sag, the server 102 may fail to start up due to damage. FIG. 5 is a schematic diagram of a waveform the voltage sag according to an embodiment of the present disclosure. As shown in FIG. 5, the horizontal coordinate represents time t and the vertical coordinate represents a voltage value V of the input voltage. When the voltage sag, a magnitude of the waveform of the voltage is significantly reduced compared with that when no voltage sag. Fault analysis is performed for the damaged or unbootable server, wherein a main cause for the fault is that the server power supply unit is damaged due to the input voltage sag. A bulk capacitor (Bulk Cap) of the power factor correction stage may be damaged, or the input fuse may be blown.

Figure 6:
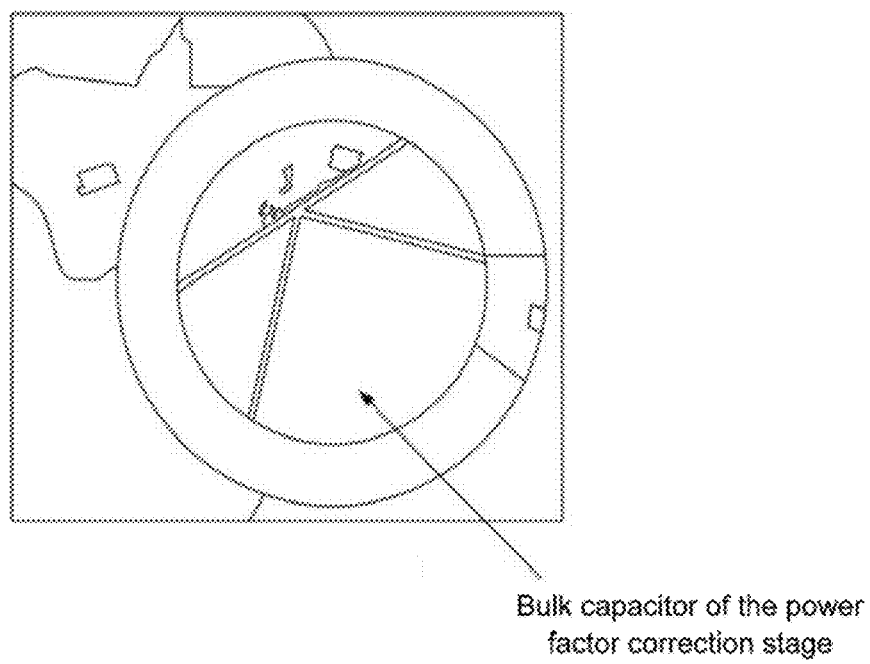
FIG. 6 is a schematic diagram of damage of a bulk capacitor according to an embodiment of the present disclosure.
Figure 7:
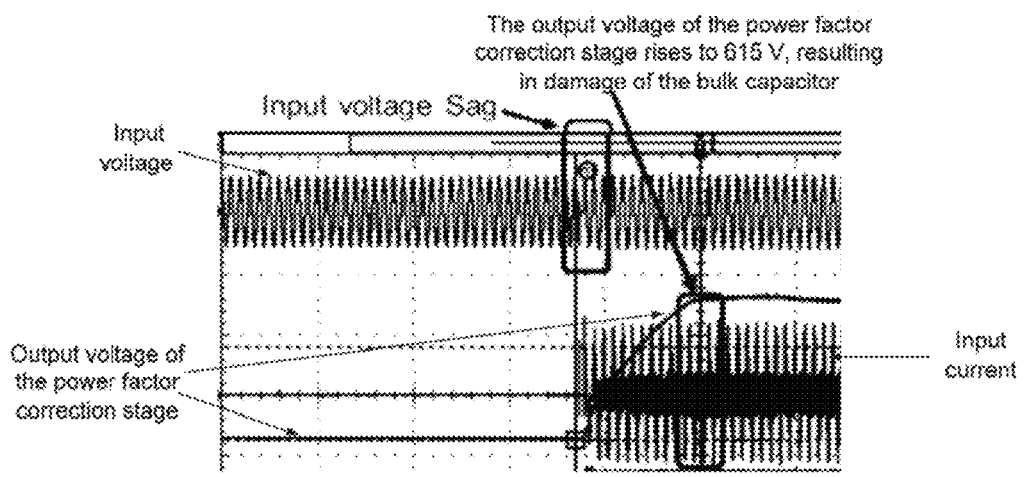
FIG. 7 is a diagram of a waveform measurement of an output voltage of the power factor correction stage according to an embodiment of the present disclosure.

FIG. 6 is a schematic diagram of damage of the bulk capacitor according to an embodiment of the present disclosure. As shown in FIG. 6, the input voltage sag results in the damage of the bulk capacitor of the power factor correction stage, which causes damage of the server power supply unit. In this case, a cause of the damage of the bulk capacitor can be analyzed by analyzing a waveform of the PFC stage Bulk Cap. FIG. 7 is a diagram of a waveform measurement of the output voltage of the power factor correction stage according to an embodiment of the present disclosure. As shown in FIG. 7, when the input voltage sag, the output voltage of the power factor correction stage (i.e., a voltage of the bulk capacitor, Bulk Cap Voltage, which is the output voltage supplied by the power supply circuit to the target apparatus) rises to 615 V, and since a withstand voltage of the Bulk Cap generally is 450 V, the Bulk Cap is damaged.

Figure 8:
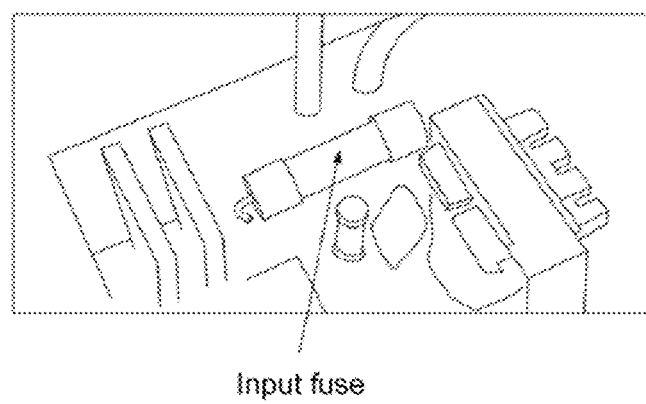
FIG. 8 is a schematic diagram of damage of an input fuse according to an embodiment of the present disclosure.
Figure 9:
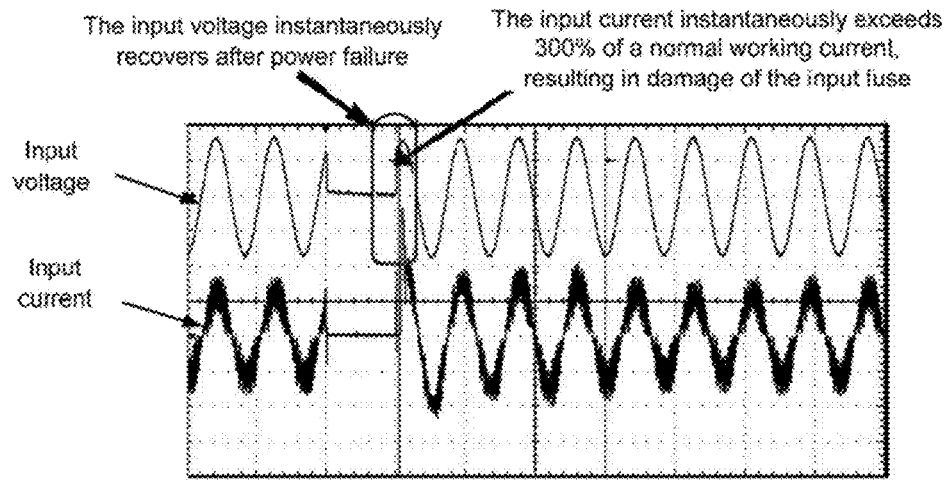
FIG. 9 is a diagram of a waveform measurement of an input current of a server power supply unit according to an embodiment of the present disclosure.

FIG. 8 is a schematic diagram of damage of the input fuse according to an embodiment of the present disclosure. As shown in FIG. 8, when the input voltage sag, the input fuse blows, resulting in failure of the power supply circuit to properly supply power to the server 102. An input current of the server power supply unit may be analyzed to learn a cause of blowing of the input fuse. FIG. 9 is a diagram of a waveform measurement of the input current of the server power supply unit according to an embodiment of the present disclosure. As shown in FIG. 9, when the input voltage sag, if the input voltage instantaneously recovers after power failure, a physical phenomenon of a reverse recovery current occurs. In this case, the input current of the server power supply unit (hereinafter abbreviated as PSU) may exceed 300% of a normal working current, resulting in damage of the input fuse. The fuse generally may support 200% of the current in 4 AC cycles, or otherwise the input fuse blows.

Through the method of controlling a power supply circuit in this embodiment of the present disclosure, whether the input voltage of the power supply circuit 104 drops may be detected in real time, whether a voltage sag occurs may be judged based on a detected drop percentage of the input voltage and a duration, and when the voltage sag, the output voltage (i.e., the voltage outputted by the DC-DC converter 112) supplied by the power supply circuit to the server 102 is controlled within a safe voltage value range, avoiding the damage of the input fuse and the damage of the bulk capacitor of the power factor correction stage, thereby greatly reducing the possibility of damage of the server power supply unit of the server 102 due to the voltage sag and ensuring normal operation of the server when the voltage sag.

Figure 10:
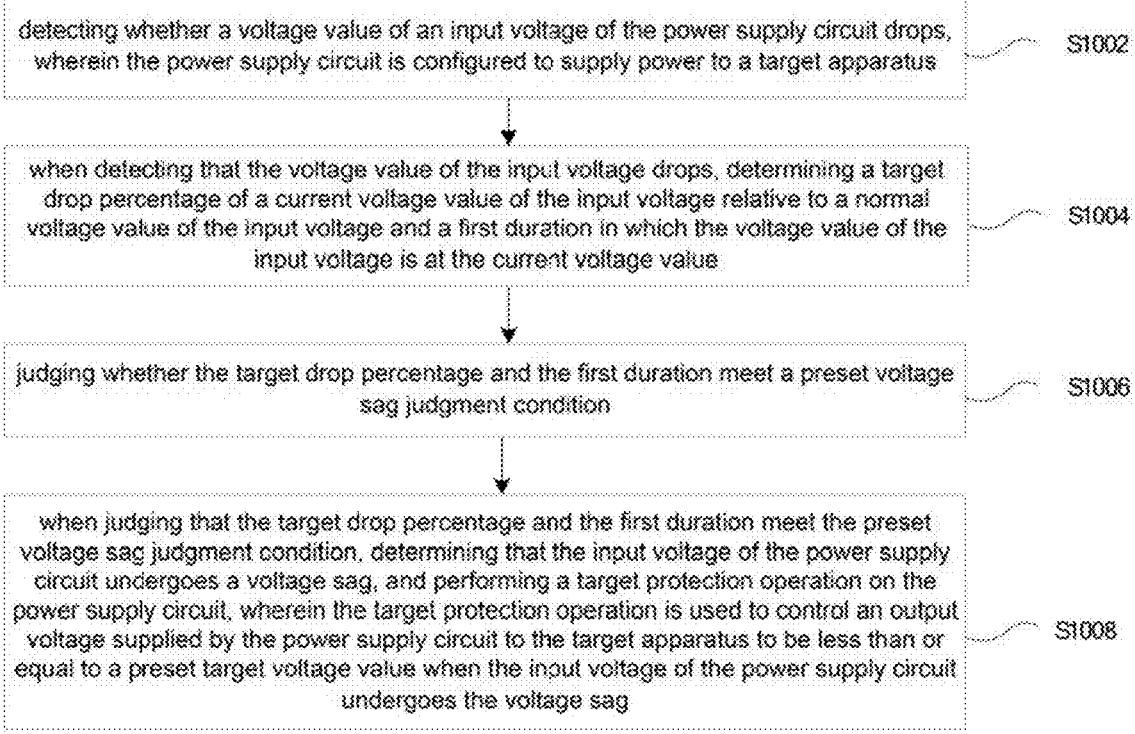
FIG. 10 is a flow diagram of a method of controlling a power supply circuit according to an embodiment of the present disclosure.

This embodiment provides a method of controlling a power supply circuit operating on each server in the above network architecture. FIG. 10 is a flow diagram of a method of controlling a power supply circuit according to an embodiment of the present disclosure. As shown in FIG. 10, the method includes the following operations:

step S1002, detecting whether a voltage value of an input voltage of the power supply circuit drops, wherein the power supply circuit is configured to supply power to a target apparatus and includes an electromagnetic interference filter, a rectifier bridge, and a power factor correction stage, an input end of the electromagnetic interference filter is connected with an alternating current power supply that provides an alternating current for the power supply circuit, an output end of the electromagnetic interference filter is connected with an input end of the rectifier bridge, an output end of the rectifier bridge is connected with an input end of the power factor correction stage, an output end of the power factor correction stage is connected with the target apparatus, and the input voltage of the power supply circuit is a voltage of the alternating current provided by the alternating current power supply;

step S1004, when detecting that the voltage value of the input voltage drops, determining a target drop percentage of a current voltage value of the input voltage relative to a normal voltage value of the input voltage after the voltage value of the input voltage drops and a first duration in which the voltage value of the input voltage is at the current voltage value;

step S1006, judging whether the target drop percentage and the first duration meet a preset voltage sag judgment condition; and step S1008, when judging that the target drop percentage and the first duration meet the preset voltage sag judgment condition, determining that the input voltage of the power supply circuit undergoes a voltage sag, and performing a target protection operation on the power supply circuit, wherein the target protection operation is used to control an output voltage supplied by the power supply circuit to the target apparatus to be less than or equal to a preset target voltage value when the input voltage of the power supply circuit undergoes the voltage sag; and the output voltage supplied to the target apparatus is a voltage outputted by the output end of the power factor correction stage.

Through the above operations, in the process of supplying power to an apparatus by the power supply circuit, whether a voltage sag occurs may be judged in real time based on the detected drop percentage of the input voltage of the power supply circuit and the duration in which the input voltage of the power supply circuit is at the voltage value after the drop, and when the voltage sag occurs, the voltage outputted by the power supply circuit to the apparatus may be controlled at a safe voltage value, to prevent the output voltage of the power supply circuit from exceeding a working voltage range of the apparatus when the input voltage sag of the power supply circuit, which may result in damage of the apparatus. As such, the problem that the input voltage sag may result in apparatus damage may be solved, and the apparatus damage resulting from the input voltage sag may be reduced.

The execution subject of the above operations may be a server, etc., but is not limited thereto.

An order of performing operation S1002 and operation S1004 is reversable, i.e., operation S1004 may be performed first and then operation S1002 is performed.

In the technical solution provided by operation S1002, the target apparatus may include, but is not limited to, electrical apparatuses such as a server and a large-scale motor in an industrial plant, the target apparatus generally requires a stable voltage input during operation, and whether the voltage value of the input voltage of the power supply circuit drops may be, but is not limited thereby, detected in real time during the process of supplying power to the target apparatus by the power supply circuit.

Optionally, in this embodiment, the input voltage of the power supply circuit may be, but is not limited to, an alternating current voltage or a direct current voltage, etc., wherein the alternating current voltage may be, but is not limited to, a voltage provided by an alternating current, and the direct current voltage may be, but is not limited to, a voltage provided by a direct current, etc.

In the technical solution provided by operation S1004, the normal voltage value may be, but is not limited to, the stable voltage value required by the target apparatus during normal operation, whether the voltage value of the input voltage of the power supply circuit drops may be, but is not limited thereby, detected in real time during the process of supplying power to the target apparatus by the power supply circuit, and the drop percentage of the voltage value relative to the normal voltage value after the drop and the duration in which the input voltage is at the voltage value after the drop are determined when detecting that the voltage value of the input voltage drops.

Optionally, in this embodiment, when detecting that the voltage value of the input voltage does not drop, it may indicate that the input voltage of the power supply circuit is in a stable state, in which case the detection of whether the voltage value of the input voltage drops may be, but is not limited thereby, continued.

In an example embodiment, the target drop percentage of the current voltage value relative to the normal voltage value after the input voltage drops may be, but is not limited thereby, determined through the following way: acquiring a voltage difference between the current voltage value and the normal voltage value; and determining the target drop percentage to be equal to a ratio of the voltage difference to the normal voltage value.

Optionally, in this embodiment, the ratio of the difference between the voltage value and the normal voltage value after the drop to the normal voltage value may be, but is not limited thereby, determined as the drop percentage of the voltage value. In this way, a drop degree of the voltage value compared with the normal voltage value after the drop is accurately reflected.

In the technical solution provided by operation S1006, whether the voltage value of the input voltage of the power supply circuit drops may be, but is not limited thereby, detected in real time during the process of supplying power to the target apparatus by the power supply circuit, the drop percentage of the voltage value relative to the normal voltage value after the drop and the duration in which the input voltage is at the voltage value after the drop are determined when detecting that the voltage value of the input voltage drops, and whether the drop degree of the current input voltage meets the voltage sag judgment condition is judged based on the drop percentage of the voltage value and the duration in which the input voltage is at the voltage value after the drop, improving the accuracy of judging whether a voltage sag occurs.

Optionally, in the present embodiment, the duration and the drop percentage in the preset voltage sag judgment condition may be, but is not limited thereby, adjusted according to an actual operation requirement of the apparatus. For example, according to the European standard EN50160, when a voltage drops below 90% of a standard value (i.e., the above normal voltage value) and then recovers to be above 90% of the standard value and a voltage value after the drop is kept for a duration of 10 ms to 60 s, it may be considered that a voltage sag occurs.

Figure 11:
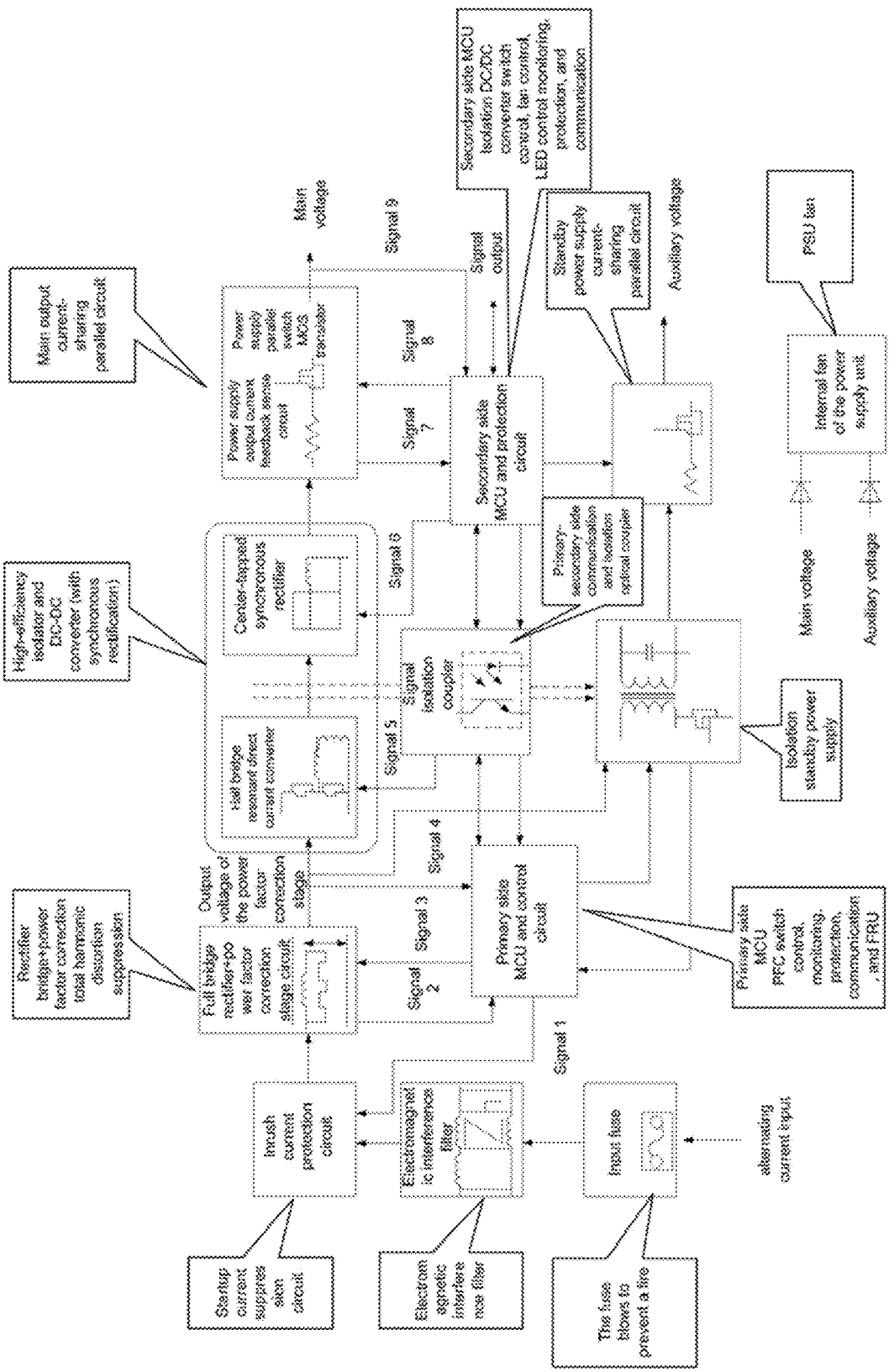
FIG. 11 is a schematic diagram of a framework of the server power supply unit according to an embodiment of the present disclosure.

Optionally, in this embodiment, whether the voltage sag occurs may be, but is not limited thereby, judged through a micro controller unit (MCU) in the server power supply unit based on the drop percentage of the input voltage and the duration in which the input voltage is at the voltage value after the drop. FIG. 11 is a schematic diagram of a framework of the server power supply unit according to an embodiment of the present disclosure. As shown in FIG. 11, the server power supply unit may be, but is not limited to, an alternating current input (AC input). The framework of the server power supply unit may include, but is not limited to, an input fuse (line fuse); an electromagnetic interference filter (EMI filter); an inrush current protection circuit (inrush protection); a full bridge rectifier; a power factor correction stage; a high-efficiency isolator and a DC-DC converter (with synchronous rectification) that may include, but are not limited to, a half bridge resonant direct current converter (half bridge LLC) and a center-tapped synchronous rectifier (center tapped with SR); a main output current-sharing parallel circuit including a power supply output current feedback sense circuit (current sense) and a power supply parallel switch MOS transistor control signal (Oring control); a standby power supply current-sharing parallel circuit; primary side MCU and protection circuit connected with a high-voltage side of a main transformer; secondary side MCU and protection circuit connected with a low-voltage side of the main transformer; a signal isolating coupler (isolator); and an internal fan of the power supply unit (PSU fan). 12 V main may be, but is not limited to, a main voltage, and 12 V standby may be, but is not limited to, an auxiliary voltage. The internal fan of the power supply unit may be, but is not limited thereby, connected with the main voltage and the auxiliary voltage.

The input fuse may, but is not limited thereby, blow to prevent a fire. The electromagnetic interference filter is configured to filter electromagnetic interference and clutter. The inrush current protection circuit is a startup current suppression circuit and may be, but is not limited thereby, configured to suppress a startup current. The full bridge rectifier and the power factor correction stage may be, but is not limited thereby, configured to suppress total harmonic distortion, and a voltage is outputted to the power factor correction stage.

The primary side MCU (i.e., the control device described above) and protection circuit may, but are not limited thereby, transmit a signal 1 (relay control signal) to the inrush current protection circuit, and the primary side MCU receives a signal 2 (an input voltage and current feedback signal of the power factor correction stage) transmitted from the full bridge rectifier and the power factor correction stage. The primary side MCU transmits a signal 3 (gate signal, which is a control signal of the switch device, i.e., MOS transistor, of the power factor correction stage) to the full bridge rectifier and the power factor correction stage, and the primary side MCU receives a signal 4 (Sense1 (close to the primary side MCU), which is an output voltage and current feedback signal of the power factor correction stage). The signal isolator transmits a signal 5 (gate signal, which is a control signal of the direct current conversion LLC MOS transistor) to the half bridge resonant direct current converter. The secondary side MCU and protection circuit output a signal 6 (SR signal, which is a control signal of the synchronous rectification switch MOS transistor) to the center-tapped synchronous rectifier. The secondary side MCU and protection circuit receive a signal 7 (Sense2 (close to the secondary side MCU), which is an output voltage and current feedback signal of the LLC direct current converter) and a signal 9 (remote sense, which is an output compensation feedback sense signal) outputted by the main output current-sharing parallel circuit, and transmit a signal 8 (Oring control, which is a control signal of the power supply parallel switch MOS transistor) to the main output current-sharing parallel circuit.

The MCU may also be, but is not limited thereby, configured for converter switch control, fan control, light-emitting diode (LED) control, monitoring, protection, communication, etc. in the power supply unit, and may be, but is not limited thereby, divided into the primary side MCU and the secondary side MCU, wherein the primary side MCU may be, but is not limited thereby, configured for switch control, monitoring, protection, communication, field replace unit (FRU), etc. of the power factor correction stage, and the secondary side MCU may be, but is not limited thereby, configured for isolation DC/DC converter switch control, fan control, LED control monitoring, protection, communication, etc.

In an example embodiment, judging whether the target drop percentage and the first duration meet the preset voltage sag judgment condition may include, but is not limited to, at least one of the following scenarios.

Scenario I: It is judged that the target drop percentage and the first duration meet the preset voltage sag judgment condition when the first duration is less than or equal to a first preset duration and the target drop percentage is greater than or equal to a first preset percentage.

Optionally, in this embodiment, when the first duration is less than or equal to the first preset duration and the target drop percentage is greater than or equal to the first preset percentage, it may indicate that the voltage value of the input voltage greatly drops in a short period of time, and such a case may indicate the occurrence of the voltage sag.

Scenario II: It is judged that the target drop percentage and the first duration meet the preset voltage sag judgment condition when the first duration is greater than a second preset duration and the target drop percentage is greater than or equal to a second preset percentage, wherein the second preset duration is greater than the first preset duration, and the second preset percentage is less than the first preset percentage.

Optionally, in this embodiment, when the first duration is greater than the second preset duration and the target drop percentage is greater than or equal to the second preset percentage, it may indicate that the voltage value of the input voltage drops little but the input voltage is at the voltage value after the drop for a long duration, and such a case may indicate the occurrence of the voltage sag.

In another example embodiment, judging that the target drop percentage and the first duration meet the preset voltage sag judgment condition may be, but is not limited thereby, carried out through the following ways: judging that the target drop percentage and the first duration meet the preset voltage sag judgment condition when the first duration is less than or equal to the first preset duration and the target drop percentage is greater than or equal to the first preset percentage, wherein the voltage value of the input voltage is a voltage value of the alternating current inputted to the power supply circuit, a value range of the first preset duration is [half a cycle of the alternating current, a cycle of the alternating current], and a value range of the first preset percentage is [90%, 99%], [90%, 95%], or [95%, 99%].

Optionally, in this embodiment, the value range of the first preset duration and the value range of the first preset percentage may be, but are not limited thereby, adjusted according to the actual operation requirement of the apparatus. For example, a voltage drop in 0 to 1/2 AC cycle, i.e., about 8 ms to 10 ms (i.e., the first preset duration) with a magnitude (i.e., the target drop percentage) greater than 95% of the normal input voltage (i.e., the first preset percentage) may be considered as an input voltage sag. For example, the input voltage is 100 V (i.e., the normal voltage value), the magnitude of the drop is 95% (i.e., the target drop percentage), and the input voltage drops to 5 V (i.e., the current voltage value). Accordingly, if the input voltage instantaneously drops below 5 V in 8 to 10 milliseconds, it may be considered that the input voltage sag occurs.

In an example embodiment, judging that the target drop percentage and the first duration meet the preset voltage sag judgment condition may be, but is not limited thereby, carried out through the following ways: judging that the target drop percentage and the first duration meet the preset voltage sag judgment condition when the first duration is greater than the second preset duration and the target drop percentage is greater than or equal to the second preset percentage, wherein the voltage value of the input voltage is a voltage value of the alternating current inputted to the power supply circuit, a value range of the second preset duration is [half a cycle of the alternating current, two cycles of the alternating current], and a value range of the second preset percentage is [20%, 40%], [20%, 30%], or [30%, 40%].

Optionally, in this embodiment, the value range of the second preset duration and the value range of the second preset percentage may be, but are not limited thereby, adjusted according to the actual operation requirement of the apparatus. For example, a voltage value drop in more than 1 AC cycle (about 16 ms to 20 ms) with a magnitude greater than 30% of the normal input voltage may be considered as an input voltage sag. For example, the input voltage is 100 V (i.e., the normal voltage value), the magnitude of the drop is 30% (i.e., the second preset percentage), and the input voltage drops to 70 V (i.e., the current voltage value). When the duration (i.e., the first duration) is greater than 20 ms (i.e., the second preset duration) and the input voltage is less than 70 V (i.e., the magnitude of the voltage value drop is less than 30%), it may indicate that the input voltage sag occurs.

In the technical solution provided by operation S1008, whether the voltage value of the input voltage of the power supply circuit drops may be, but is not limited thereby, detected in real time during the process of supplying power to the target apparatus by the power supply circuit; the drop percentage of the voltage value relative to the normal voltage value after the drop and the duration in which the input voltage is at the voltage value after the drop are determined when detecting that the voltage value of the input voltage drops; whether the drop degree of the current input voltage meets the voltage sag judgment condition is judged based on the drop percentage of the voltage value and the duration in which the input voltage is at the voltage value after the drop; and when the voltage sag, the output voltage supplied to the apparatus by the power supply circuit is controlled within a voltage value range that is safe for the apparatus, avoiding a surge of the output voltage supplied to the apparatus by the power supply circuit that results from the input voltage sag, and ensuring normal operation of the apparatus.

Optionally, in this embodiment, the output voltage supplied to the apparatus by the power supply circuit may be, but is not limited thereby, controlled by the way of controlling the voltage outputted by the power factor correction stage. In this way, the damage of the server resulting from the damage of the bulk capacitor of the power factor correction stage is avoided.

In an example embodiment, the target protection operation may be, but is not limited thereby, performed on the power supply circuit in the following way: adjusting a duty cycle of a control signal of the output voltage in the power supply circuit such that the output voltage is less than or equal to the preset target voltage value.

Optionally, in this embodiment, the target voltage value may be, but is not limited to, a voltage value for controlling safe operation of the power factor correction stage, and may be, but is not limited to, 80%, 90%, 85%, etc. of the input voltage of the power supply circuit. When the input voltage sag, a formula for calculating the output voltage (PFC Output) of the power factor correction stage is as follows: PFC Output=(6000−(4000*ADC counter/(main_Output_Current>>6))*ADC counter<440, wherein 6000 is a constant value of the formula for calculation, 4000 is a constant value of the formula for calculation, ADC counter is a value of an analog-to-digital converter (ADC) fed back into the MCU, PFC Output is the output voltage of the power factor correction stage, main_Output_Current is a PSU output current (i.e., the reverse recovery current), main_Output_Current>>6 means that the ADC counter conversion value should be greater than 6, and PFC Output<440 means that the output voltage of the power factor correction stage should be less than 440 V.

It should be noted that a main_Output_Current condition needs to be set, i.e., main_Output_Current cannot be zero. Under a given test condition, two PSUs are connected in parallel, with one of the PSUs maintained in a standby mode without a main output, and a result cannot be zero, i.e., it is necessary to ensure main_Output_Current≠0. Overflow will occur in digital signal processing (DSP) and then the output is out of control, causing the output voltage V_BULK of the power factor correction stage to rise. main_Output_Current≠0. As long as main_Output_Current>64, it will never be divided by zero.

The output voltage of the power factor correction stage may be, but is not limited thereby, controlled when the output voltage of the power factor correction stage is greater than 440 V. For example, a 3200 W PSU with a 12 V output is a 12-bit MCU. Accordingly, main_Output_Current is 3200 W/12 V=266.67 A, a resolution of the 12-bit MCU is 2 to the 12th power=4096, main_Output_Current is converted into the ADC counter=266.67/4096=0.0651, and in this case, PFC Output=(6000−(4000*0.0651/266.67)*0.0651=390.5 V. When 390.5 V<440 V, there is a normal output. Based on main_Output_Current>>6, a conversion output of the ADC counter may be 0.0651*6=0.309 A, that is, no calculation error occurs when the output current is greater than 0.309 A.

When main_Output_Current>64, ADC counter>64, and it will not be divided by 0 or a number close to 0, thus avoiding divergence. If a protection scenario where main_Output_Current is 130%*266.67 A=346.67 A occurs, in this case, ADC counter=346.67/4096=0.08464. At this time, the PFC Output=(6000−(4000*0.08464/346.67)*)0.08464=518.6 V>440 V, and the output voltage of the power factor correction stage needs to be controlled, so as to protect the power factor correction stage.

Optionally, in this embodiment, the duty cycle (Duty) refers to a percentage of a duration in which a circuit is on with respect to an entire working cycle of the circuit, and the output voltage of the power supply circuit may be, but is not limited thereby, controlled to be less than or equal to a voltage value that is safe for the apparatus (i.e., the target voltage value) by adjusting the duty cycle.

Optionally, in this embodiment, the target voltage value when the first duration is greater than the second preset duration and the target drop percentage is greater than or equal to the second preset percentage and the target voltage value when the first duration is greater than the second preset duration and the target drop percentage is greater than or equal to the second preset percentage may be, but is not limited thereby, the same voltage value (e.g., both are 440 V) or different voltage values.

In an example embodiment, the duty cycle of the control signal of the output voltage in the power supply circuit may be, but is not limited thereby, adjusted through the following way, such that the output voltage is less than or equal to the preset target voltage value: adjusting the duty cycle of the control signal to be less than or equal to a target duty cycle, such that the output voltage is less than or equal to the preset target voltage value, wherein the target duty cycle is a duty cycle determined according to the target voltage value and the current voltage value.

Optionally, in this embodiment, the duty cycle of the control signal may be, but is not limited thereby, adjusted to be less than or equal to the target duty cycle, such that the output voltage of the power supply circuit is less than or equal to the preset target voltage value.

In an example embodiment, the target duty cycle may be, but is not limited thereby, determined through the following formula: D=1−V1/V2, wherein V1 represents the current voltage value, and V2 represents the target voltage value.

Optionally, in this embodiment, the output voltage of the power factor correction stage=the current voltage value/(1−D), wherein D<1 (the duty cycle is less than 1). That is, for the power factor correction stage, when the current voltage value is less than the target voltage value, the power factor correction stage needs to provide a large duty cycle to meet a demand for boosting. Accordingly, the wider a range of the input voltage is, the stronger a duty cycle adjustment capability is.

Optionally, in this embodiment, a voltage drop in 0 to 1/2 AC cycle, i.e., about 8 ms to 10 ms (i.e., the first preset duration) with a magnitude (i.e., the target drop percentage) greater than 95% of the normal input voltage (i.e., the first preset percentage) may be judged as an input voltage sag. If the input voltage is 100 V (i.e., the normal voltage value), the magnitude of the drop is 95% (i.e., the target drop percentage), and the target voltage value is 440 V, the input voltage drops to 5 V (i.e., the current voltage value). Accordingly, if the input voltage instantaneously drops below 5 V in 8 to 10 milliseconds (i.e., the first duration), it may be considered that the input voltage sag occurs. In this case, according to $440=5/(1-D)$, a limit of the duty cycle D is calculated to be 0.98, that is, the duty cycle of the control signal is adjusted to be less than or equal to 0.98.

Optionally, in this embodiment, the input voltage is 100 V (i.e., the normal voltage value), the magnitude of the drop is 30% (i.e., the second preset percentage), the target voltage value is 440 V, and the input voltage drops to 70 V (i.e., the current voltage value). When the duration (i.e., the first duration) is greater than 20 ms (i.e., the second preset duration) and the input voltage is less than 70 V (i.e., the magnitude of the voltage value drop is less than 30%), it may indicate that the voltage sag occurs. In this case, according to $440=70/(1-D)$, a limit of the duty cycle D is calculated to be 0.84 (i.e., the target duty cycle), that is, the duty cycle of the control signal is adjusted to be less than or equal to 0.84.

In an example embodiment, the duty cycle of the control signal may be, but is not limited thereby, adjusted to be less than or equal to the target duty cycle through the following way: inputting a target pulse-width modulation signal as a driving signal to a switch device in the power supply circuit, such that the duty cycle of the control signal outputted by the switch device is adjusted to be less than or equal to the target duty cycle, wherein the target pulse-width modulation signal is used to control the switch device to switch on or off.

Optionally, in this embodiment, a pulse-width modulation (PWM) signal may be, but is not limited thereby, supplied by the primary side MCU in the server power supply unit to the main switch Q (i.e., the switch device), and the main switch Q generates a duty cycle matching the PWM signal as a driving signal (i.e., the control signal), to control operation of the power factor correction stage and the output voltage of the power factor correction stage.

For a better understanding of a control process of the power supply circuit, the control process of the power supply circuit is further illustrated below in combination with optional embodiments, which may be, but is not limited thereby, applicable to the embodiments of the present disclosure.

Figure 12:
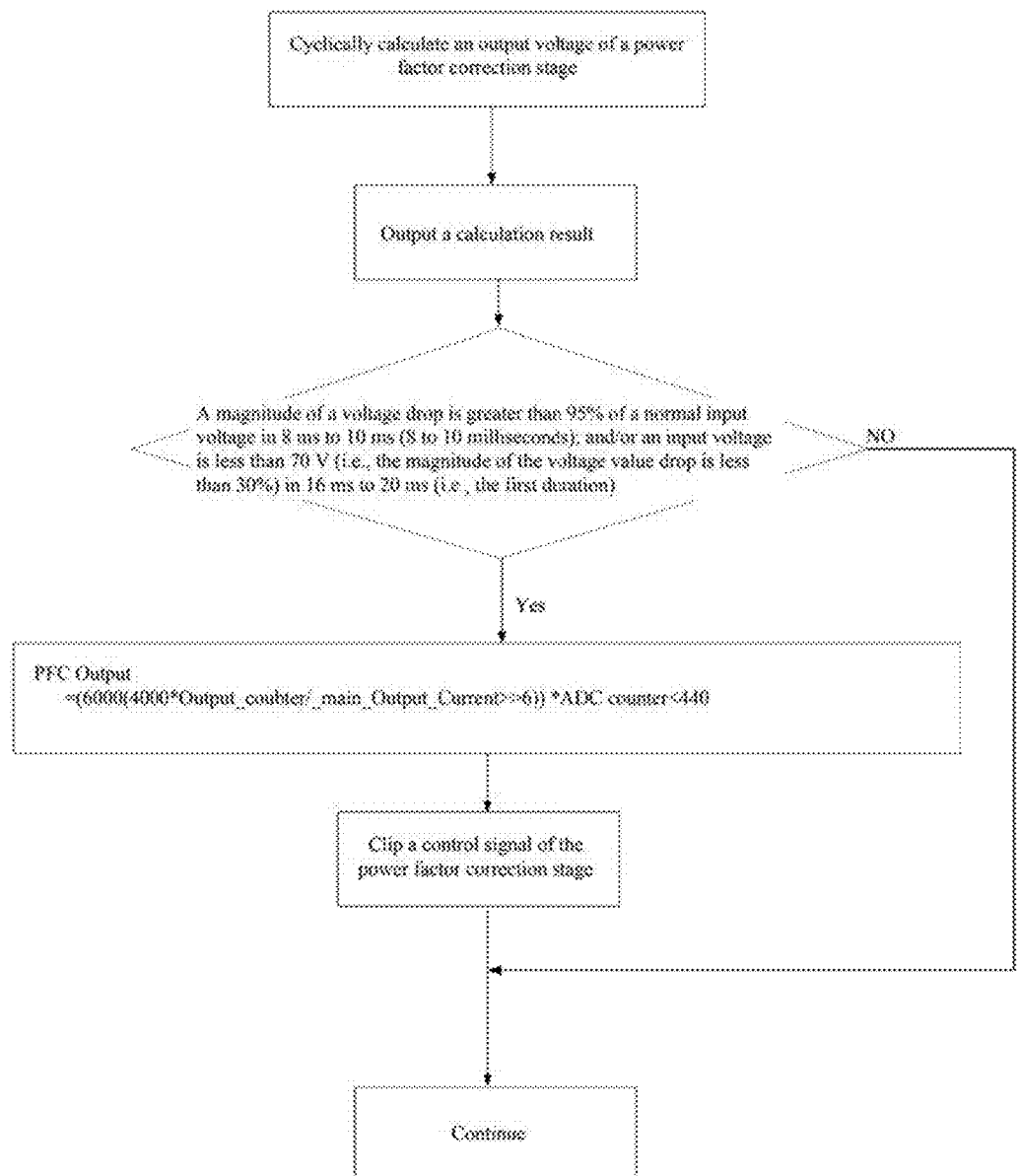
FIG. 12 is a schematic diagram of adjusting a duty cycle according to an embodiment of the present disclosure.

FIG. 12 is a schematic diagram of adjusting the duty cycle according to an embodiment of the present disclosure. As shown in FIG. 12, first, whether an input voltage sag occurs is judged based on the first duration and the target drop percentage. For example, in 0 to 1/2 AC cycle, Vin<Nominal AC Voltage ranges drop 95%, that is, a voltage drop occurring in 0 to 1/2 AC cycle (i.e., the first duration less than or equal to the first preset duration), i.e., about 8 ms to 10 ms (8 to 10 milliseconds), with a magnitude greater than 95% (i.e., the target drop percentage greater than or equal to the first preset percentage) of the normal input voltage, may be considered as an input voltage sag; and/or in a duration greater than 1 AC cycle, Vin<Nominal AC Voltage ranges drop 30%, that is, in a duration (16 ms to 20 ms) greater than 1 AC cycle, the input voltage is 100 V (i.e., the normal voltage value) and the magnitude of the drop is 30% (i.e., the second preset percentage), that is, the input voltage drops to 70 V (i.e., the current voltage value). When the input voltage is less than 70 V (i.e., the magnitude of the voltage value drop is less than 30%) in 16 ms to 20 ms (i.e., the first duration), it may indicate that the voltage sag occurs.

When judging that the voltage sag occurs, the output voltage of the power factor correction stage may be, but is not limited thereby, calculated through the following formula: PFC Output=(6000−(4000*ADC counter/(main_Output_Current>>6))*ADC counter<440. Then the pulse-width modulation (PWM) signal is supplied by the primary side MCU in the server power supply unit to the main switch Q (i.e., the switch device) through a gate power amplifier (gate driver), and the main switch Q generates a duty cycle matching the PWM signal as a driving signal (i.e., the control signal), to control operation of the power factor correction stage and the output voltage of the power factor correction stage.

In an example embodiment, when determining that the input voltage of the power supply circuit undergoes the voltage sag, whether the input current of the power supply circuit is abnormal may be, but is not limited thereby, determined through the following way: acquiring current values of a reverse recovery current of the power supply circuit in a plurality of cycles of the alternating current, wherein the voltage value of the input voltage is the voltage value of the alternating current inputted to the power supply circuit; judging whether the current values of the reverse recovery current in the plurality of cycles meet a preset current abnormity judging condition; and determining that the input current of the power supply circuit is abnormal when the current values of the reverse recovery current in the plurality of cycles meet the current abnormity judging condition.

Figure 13:
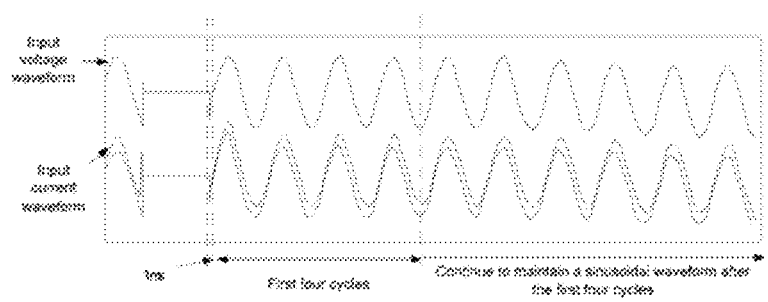
FIG. 13 is a diagram of a waveform of a reverse recovery current according to an embodiment of the present disclosure.

Optionally, in this embodiment, when the input voltage sag, if the input voltage instantaneously recovers, a physical phenomenon of a reverse recovery current occurs. FIG. 13 is a diagram of a waveform of the reverse recovery current according to an embodiment of the present disclosure. As shown in FIG. 13, current disturbance is allowed during the first 1 ms, which results in the physical phenomenon of the reverse recovery current when the input voltage instantaneously recovers. This may cause a surge of input current (Iac) in the first four cycles, which results in the damage of the input fuse in the power supply circuit, and the input voltage (AC) and input current continue to maintain a sinusoidal waveform in the subsequent four cycles. The current values of the reverse recovery current of the power supply circuit in a plurality of cycles of the alternating current may be, but are not limited thereby, monitored through the primary side MCU in real time, and whether the input current of the power supply circuit is abnormal is determined based on the current values of the reverse recovery current of the power supply circuit in the plurality of cycles of the alternating current.

Optionally, in this embodiment, it is determined that the input current of the power supply circuit is not abnormal when all the current values of the reverse recovery current in the plurality of cycles do not meet the current abnormity judging condition. It is determined that the input current of the power supply circuit is abnormal when at least one of the current values of the reverse recovery current in the plurality of cycles meets the current abnormity judging condition.

In an example embodiment, whether the current values of the reverse recovery current in the plurality of cycles meet the preset current abnormity judging condition may be, but is not limited thereby, judged through the following way: judging whether all the current values of the reverse recovery current in successive N cycles of the alternating current are less than a first preset current value, wherein N is a positive integer greater than or equal to 2, the first preset current value is A times of a normal current value of a working current of the power supply circuit, A is a positive number greater than 1, and the plurality of cycles include the N cycles; and judging that the current values of the reverse recovery current in the plurality of cycles meet the current abnormity judging condition when not all the current values of the reverse recovery current in the N cycles are less than the first preset current value.

Optionally, in this embodiment, when judging that all the current values of the reverse recovery current in the successive N cycles of the alternating current are less than the first preset current value, it may indicate that the current values of the reverse recovery current do not meet the current abnormity judging condition, that is, the reverse recovery current is normal.

Optionally, in this embodiment, the normal current value may be, but is not limited thereby, corresponding to the number of server power supply units. For example, when one PSU is operating, a working current (i.e., the normal current value) is 1*Iin (A), wherein Iin (A) is the normal working current of one PSU; when two PSUs are operating, a working current (i.e., the normal current value) is defined as 2*Iin (A), wherein Iin (A) is the normal working current of one PSU.

In an example embodiment, whether the current values of the reverse recovery current in the plurality of cycles meet the preset current abnormity judging condition may be, but is not limited thereby, judged through the following way: judging whether all the current values of the reverse recovery current in successive M cycles after the N cycles are less than a second preset current value when all the current values of the reverse recovery current in the N cycles are less than the first preset current value, wherein M is a positive integer greater than or equal to 2, the second preset current value is B times of the normal current value of the working current of the power supply circuit, B is a positive number greater than 1, B is less than A, and the plurality of cycles include the N cycles and the M cycles; and judging that the current values of the reverse recovery current in the plurality of cycles meet the current abnormity judging condition when not all the current values of the reverse recovery current in the M cycles are less than the second preset current value.

Optionally, in this embodiment, whether all the current values of the reverse recovery current in the successive M cycles after the N cycles are less than the second preset current value is judged when all the current values of the reverse recovery current in the N cycles are less than the first preset current value, and it is judged that the current values of the reverse recovery current in the plurality of cycles do meet the current abnormity judging condition when all the current values of the reverse recovery current in the M cycles are less than the second preset current value.

In an example embodiment, whether the current values of the reverse recovery current in the plurality of cycles meet the preset current abnormity judging condition may be, but is not limited thereby, judged through the following way: judging whether all the current values of the reverse recovery current in successive P cycles after the M cycles are less than a third preset current value when all the current values of the reverse recovery current in the M cycles are less than the second preset current value, wherein P is a positive integer greater than or equal to 2, the third preset current value is C times of the normal current value of the working current of the power supply circuit, C is a positive number greater than 1, C is less than B, and the plurality of cycles include the N cycles, the M cycles and the P cycles; and judging that the current values of the reverse recovery current in the plurality of cycles meet the current abnormity judging condition when not all the current values of the reverse recovery current in the P cycles are less than the third preset current value.

Optionally, in this embodiment, whether all the current values of the reverse recovery current in the successive P cycles after the M cycles are less than the third preset current value is judged when all the current values of the reverse recovery current in the M cycles are less than the second preset current value, and it is judged that the current values of the reverse recovery current in the plurality of cycles do meet the current abnormity judging condition when all the current values of the reverse recovery current in the successive P cycles after the M cycles are less than the third preset current value.

In an example embodiment, a value range of A is [2.5, 3.5], [2.5, 3], or [3, 3.5]; a value range of B is [1.5, 2.4], [1.5, 2], or [2, 2.4]; and a value range of C is (1, 1.4], (1, 1.1], or [1.1, 1.4].

Figure 14:
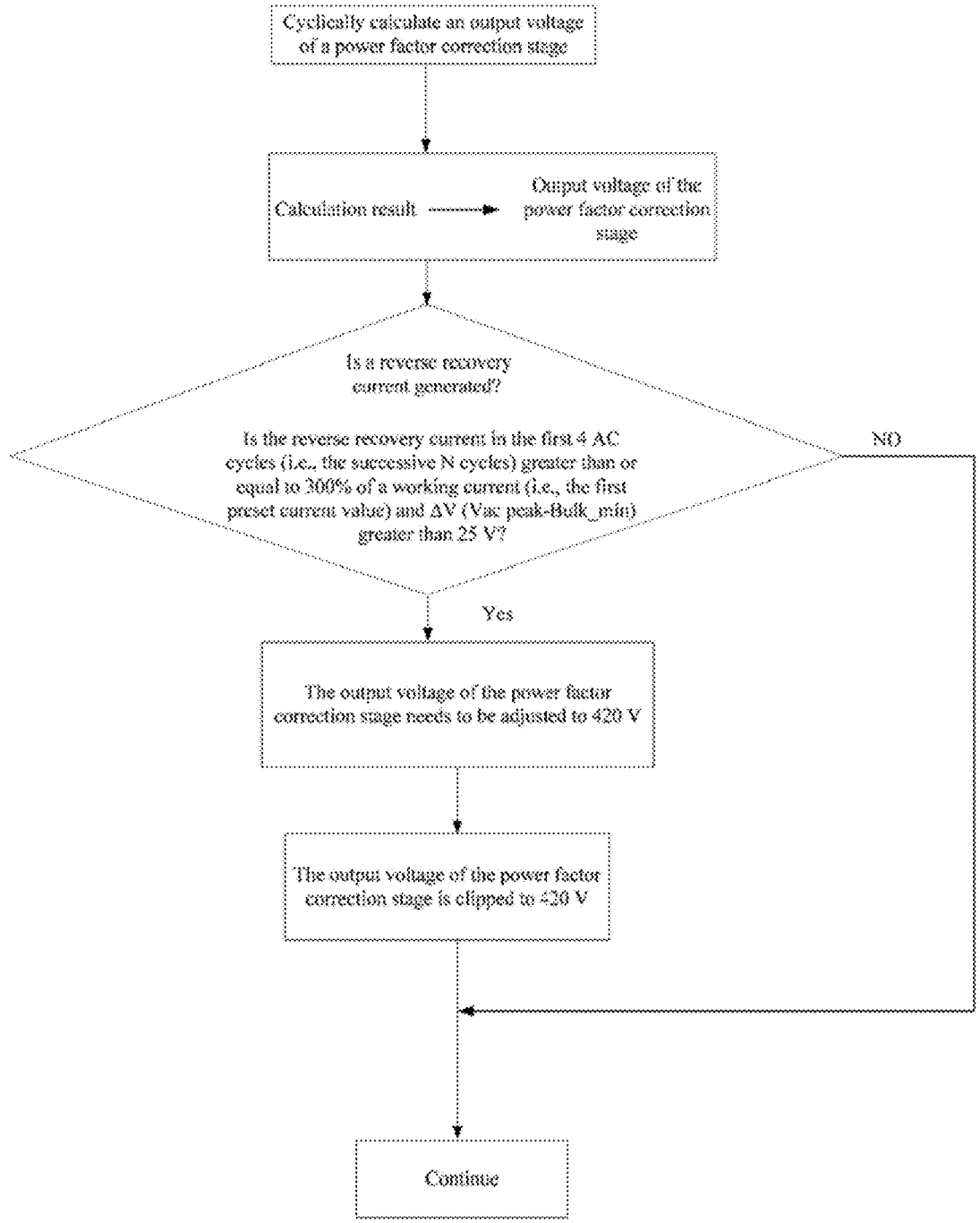
FIG. 14 is a schematic diagram of controlling the output voltage of the power factor correction stage according to an embodiment of the present disclosure.

Optionally, in this embodiment, when judging that the input voltage sag occurs, whether the current values of the reverse recovery current in the plurality of cycles meet the current abnormity judging condition may be, but is not limited thereby, judged by the primary side MCU. FIG. 14 is a schematic diagram of controlling the output voltage of the power factor correction stage according to an embodiment of the present disclosure. As shown in FIG. 14, whether a reverse recovery current is generated may be judged, which is not limited thereto, and when generating the reverse recovery current, whether the reverse recovery current in the first 4 AC cycles (i.e., the successive N cycles) is greater than or equal to 300% of the working current (i.e., the first preset current value) and whether $\Delta V$ (Vac peak–Bulk_min) is greater than 25 V are judged. When judging that the reverse recovery current in the first 4 AC cycles (i.e., the successive N cycles) is greater than or equal to 300% of the working current (i.e., the first preset current value) and $\Delta V$ (Vac peak–Bulk_min) is greater than 25 V, the output voltage (i.e., the output voltage supplied to the target apparatus by the power supply circuit) of the power factor correction stage needs to be adjusted to 420 V, in which case the output voltage of the power factor correction stage is clipped to 420 V. In this way, the blowing of the input fuse due to the reverse recovery current is effectively prevented, which may avoid the damage of the server PSU resulting from the input voltage sag.

Optionally, in this embodiment, current disturbance may be allowed during the first 1 ms, which is not limited thereto, and the reverse recovery current in the first 4 AC cycles (i.e., the successive N cycles) should be controlled to be no more than 300% of the working current (i.e., the first preset current value). The reverse recovery current in the subsequent 4 AC cycles (i.e., the M cycles) do not exceed 200% of the working current (i.e., the second preset current value). The reverse recovery current in the subsequent 25 AC cycles (i.e., the P cycles) do not exceed 110% of the working current (i.e., the third preset current value). In any of the above cycles, when the current value of the reverse recovery current does not meet a corresponding preset current value, the output voltage of the power factor correction stage may be adjusted to 420 V, which is not limited thereto, avoiding the blowing of the input fuse which results in the damage of the server power supply unit.

Optionally, in this embodiment, when determining that the input current of the power supply circuit is abnormal, the duty cycle of the control signal of the output voltage in the power supply circuit may be adjusted, which is not limited thereto, such that the output voltage is less than or equal to the preset target voltage value. The preset voltage value may be either the same as the target voltage value or different from the target voltage value. The output voltage (V_Bulk) of the power factor correction stage may be adjusted to 420 V under control of the primary side MCU, which is not limited thereto. A formula of judging a feedback voltage for the output voltage of the power factor correction stage of the server PSU may be shown as follows:

$$V_{Bulk_{min}} = \frac{PSFB\_Eff \sqrt{\frac{C\_Bulk \cdot (C\_Tolerance - 1) \cdot \left( \begin{array}{c} 2 \cdot Load \cdot P_o \cdot \Delta t - C\_Bulk \cdot PSFB\_Eff \cdot Vbulk\_noramal^2 + \\ C\_Bulk \cdot C\_Tolerance \cdot PSFB\_Eff \cdot Vbulk\_noramal^2 \end{array} \right)}{PSFB\_Eff}}}{C\_Bulk \cdot PSFB\_Eff - C\_Bulk \cdot C\_Tolerance \cdot PSFB\_Eff}$$

wherein V_Bulk_min is a minimum value of the output voltage of the power factor correction stage; V_Bulk_normal is a normal value of the output voltage of the power factor correction stage, which usually is 415 V; Po is output power of the PSU, which may be, but is not limited to, 3200 W; Load is a load condition, which may be, but is not limited to, 80%; PSFB_Eff is full bridge phase-shift conversion efficiency of a PSU main output topology, which may be, but is not limited to, 96%; and Δt is a duration of the reverse recovery current, which may be, but is not limited to, 20 ms. C_Bulk is a capacitance value of the capacitor (212, Bulk Cap) in the power factor correction stage, which may be, but is not limited to, 925 uF. C_Tolerance is an error range of the capacitance value of the capacitor (212, Bulk Cap) in the power factor correction stage.

The power factor correction stage does not work when Vac_peak>V_Bulk, wherein Vac_peak is a peak value of the input voltage of the alternating current. ΔV (Vac peak–Bulk_min)>25V. When reverse recovery current>300%*Iin, wherein Iin is the normal working current of the server, in order to cover the Bulk cap (Tolerance: 80%), the output voltage (V_Bulk) of the power factor correction stage (PFC stage) needs to be adjusted to 420 V. That is, the voltage of the capacitor (212, Bulk Cap) in the power factor correction stage is increased to 420 V (Io>72 A) to realize larger coverage.

An embodiment of the present disclosure further provides a device of controlling a power supply circuit, wherein the device of controlling a power supply circuit includes: an input voltage detection module configured to acquire a voltage value of an input voltage of the power supply circuit, wherein the power supply circuit is configured to supply power to a target apparatus; and a control module configured to, when detecting that the voltage value of the input voltage of the power supply circuit drops, determine a target drop percentage of a current voltage value of the input voltage relative to a normal voltage value of the input voltage after the voltage value of the input voltage drops and a first duration in which the voltage value of the input voltage is at the current voltage value, judge whether the target drop percentage and the first duration meet a preset voltage sag judgment condition, and when judging that the target drop percentage and the first duration meet the preset voltage sag judgment condition, determine that the input voltage of the power supply circuit undergoes a voltage sag, and perform a target protection operation on the power supply circuit, wherein the target protection operation is used to control an output voltage supplied by the power supply circuit to the target apparatus to be less than or equal to a preset target voltage value when the input voltage of the power supply circuit undergoes the voltage sag.

In an example embodiment, the control module is a processing device configured to judge whether the target drop percentage and the first duration meet the preset voltage sag judgment condition by performing the following operations: judging that the target drop percentage and the first duration meet the preset voltage sag judgment condition when the first duration is less than or equal to a first preset duration and the target drop percentage is greater than or equal to a first preset percentage; and/or judging that the target drop percentage and the first duration meet the preset voltage sag judgment condition when the first duration is greater than a second preset duration and the target drop percentage is greater than or equal to a second preset percentage, wherein the second preset duration is greater than the first preset duration, and the second preset percentage is less than the first preset percentage.

In an example embodiment, the device further includes the power supply circuit, wherein the power supply circuit includes a switch device configured to output a control signal; the control module is connected with the power supply circuit, and configured to perform the target protection operation on the power supply circuit by performing the following operations: inputting a target pulse-width modulation signal as a driving signal to the switch device in the power supply circuit, such that a duty cycle of the control signal outputted by the switch device is adjusted to be less than or equal to a target duty cycle, wherein the target pulse-width modulation signal is used to control the switch device to switch on or off, and the duty cycle of the control signal is used to cause the output voltage to be less than or equal to the preset target voltage value; the power supply circuit includes an electromagnetic interference filter, a rectifier bridge, and a power factor correction stage, an input end of the electromagnetic interference filter is connected with an alternating current power supply that provides an alternating current for the power supply circuit, an output end of the electromagnetic interference filter is connected with an input end of the rectifier bridge, an output end of the rectifier bridge is connected with an input end of the power factor correction stage, an output end of the power factor correction stage is connected with the target apparatus, and the switch device is in the power factor correction stage; and the input voltage of the power supply circuit is a voltage of the alternating current provided by the alternating current power supply, and the output voltage supplied to the target apparatus is a voltage outputted by the output end of the power factor correction stage.

In an example embodiment, the device further includes an input current detection module configured to acquire current values of a reverse recovery current of the power supply circuit in a plurality of cycles of the alternating current when determining that the input voltage of the power supply circuit undergoes the voltage sag, wherein the voltage value of the input voltage is a voltage value of the alternating current inputted to the power supply circuit; and the control module is further configured to judge whether the current values of the reverse recovery current in the plurality of cycles meet a preset current abnormity judging condition, and determine that the input current of the power supply circuit is abnormal when the current values of the reverse recovery current in the plurality of cycles meet the current abnormity judging condition.

Figure 15:
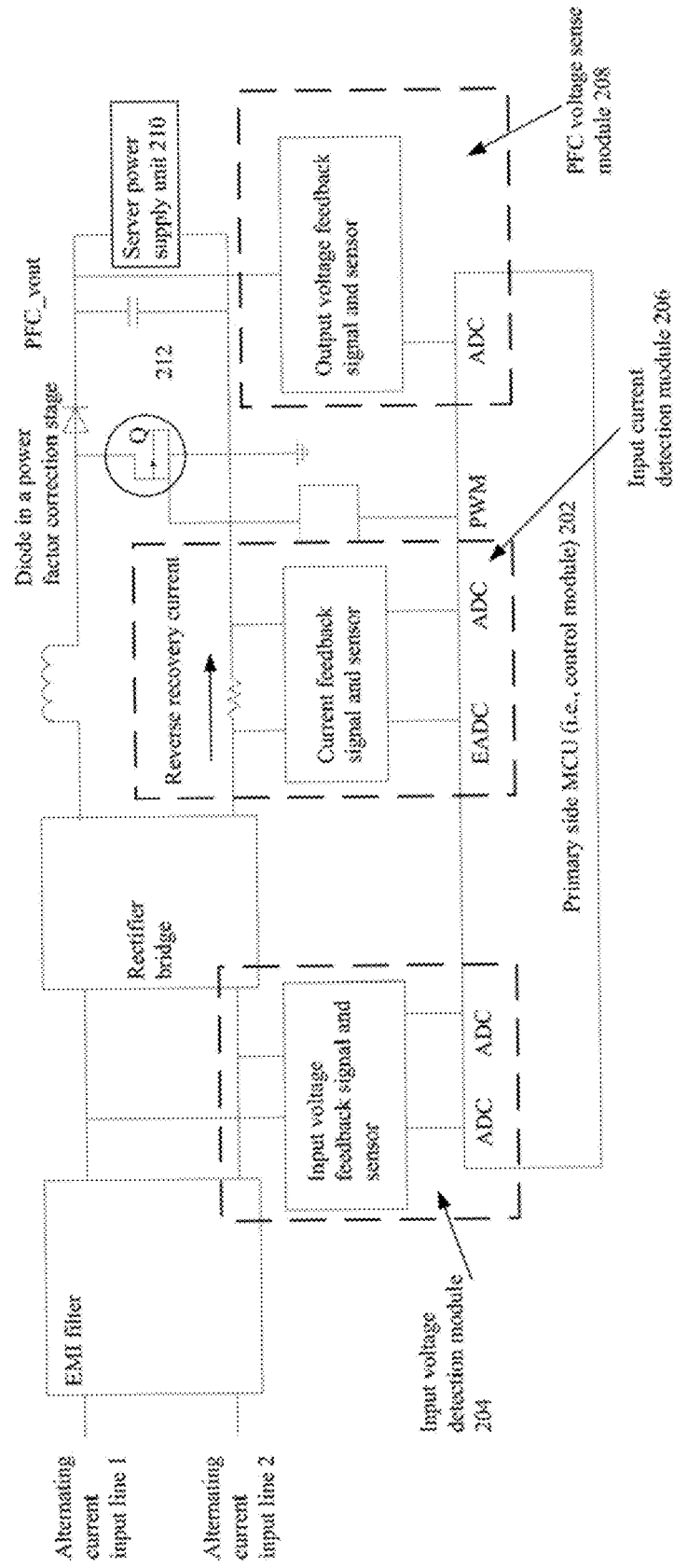
FIG. 15 is a schematic diagram of a structure of the server power supply unit according to an embodiment of the present disclosure.

FIG. 15 is a schematic diagram of a structure of the server power supply unit according to an embodiment of the present disclosure. As shown in FIG. 15, the power supply circuit may include, but is not limited to, the electromagnetic interference (EMI) filter, the rectifier bridge, the power factor correction stage, and the DC-DC converter, wherein an alternating current input line 1 (AC_LINE1) and an alternating current input line 2 (AC_LINE2) provide the input voltage for the power supply circuit 104, and the power factor correction stage includes the diode and the switch Q.

The device of controlling a power supply circuit may include, but is not limited to, a primary side MCU (i.e., the control module) 202, an input voltage detection module 204, an input current detection module 206, a voltage sense module 208 of the power factor correction stage, and a server power supply unit 210. The input voltage detection module 204 includes an input voltage feedback signal and a sensor (Vin sense signal conditioning) in the power factor correction stage and an analog-to-digital converter (ADC, analog-to-digital signal conversion). The input current detection module 206 includes a current feedback signal and a sensor (current sense signal conditioning) in the power factor correction stage, an ADC, and an EADC. The voltage sense module 208 of the power factor correction stage may include, but is not limited to, the current feedback signal and the sensor (Vout sense signal conditioning) in the power factor correction stage and an ADC. The primary side MCU may, but is not limited thereby, sense the input voltage and the input current of the power supply circuit through the input voltage detection module 204 and the input current detection module 206, and may, but is not limited thereby, sense the output voltage (PFC_vout) of the power factor correction stage through the voltage sense module 208. When sensing that the input voltage sag occurs, the switch pulse-width modulation (PWM) signal in the power factor correction stage is inputted to the switch device Q in the power supply circuit as a driving signal, such that the duty cycle of the control signal outputted by the switch device Q is less than or equal to the target duty cycle, thereby controlling the output voltage of the power factor correction stage to be within a voltage value range (which may be, but is not limited thereby, less than or equal to 440 V) that is safe for the apparatus. Then whether the reverse recovery current of the power supply circuit is abnormal is detected, and the output voltage of the power factor correction stage is controlled to be within a range of 420 V when the reverse recovery current is abnormal. In this way, the trouble resulting from the problem of the input voltage sag, which requires an operation and maintenance worker to perform on-site troubleshooting in a server room, is greatly reduced, thereby greatly reducing labor and time costs of maintaining the normal operation of the server. In addition, the method of controlling a power supply circuit in this embodiment of the present disclosure does not require additional hardware setup, and this function may be added to the existing architecture and firmware.

Through the above description of the embodiments, those skilled in the art could clearly learn that the method in the above embodiments may be implemented with software and a necessary general-purpose hardware platform or with hardware, while in many cases the former is a preferable implementation. Based on such an understanding, the essence or a portion contributing to the existing technology of the technical solutions of the embodiments of the present disclosure may be embodied in the form of a software products. The computer software product is stored in a storage medium (such as a ROM/RAM, a diskette, or an optical disk), and includes several instructions used to enable a terminal apparatus (which may be a cell phone, a computer, a server, a network device, etc.) to execute the method of each embodiment of the present disclosure.

This embodiment further provides a device of controlling a power supply circuit, wherein the device is configured to implement the above embodiments and optional embodiments, and the description is no longer repeated here. As used hereinafter, the term "module" may be a combination of software and/or hardware that implements a preset function. Although the device described in the following embodiment is preferably implemented in software, an implementation in hardware or a combination of software and hardware is possible and conceivable.

Figure 16:
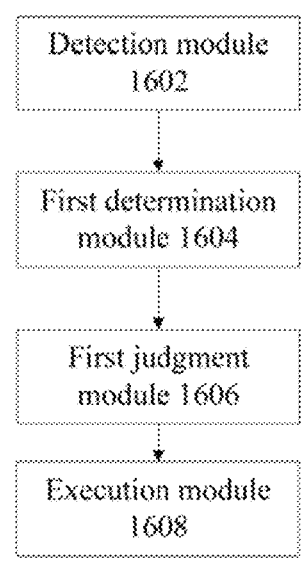
FIG. 16 is a block diagram of a structure of a device of controlling a power supply circuit according to an embodiment of the present disclosure.

FIG. 16 is a block diagram of a structure of the device of controlling a power supply circuit according to an embodiment of the present disclosure. As shown in FIG. 16, the device includes: a detection module 1602 configured to detect whether a voltage value of an input voltage of the power supply circuit drops, wherein the power supply circuit is configured to supply power to a target apparatus and includes an electromagnetic interference filter, a rectifier bridge, and a power factor correction stage, an input end of the electromagnetic interference filter is connected with an alternating current power supply that provides an alternating current for the power supply circuit, an output end of the electromagnetic interference filter is connected with an input end of the rectifier bridge, an output end of the rectifier bridge is connected with an input end of the power factor correction stage, an output end of the power factor correction stage is connected with the target apparatus, and the input voltage of the power supply circuit is a voltage of the alternating current provided by the alternating current power supply;

a first determination module 1604 configured to, when detecting that the voltage value of the input voltage drops, determine a target drop percentage of a current voltage value of the input voltage relative to a normal voltage value of the input voltage after the voltage value of the input voltage drops, and a first duration in which the voltage value of the input voltage is at the current voltage value;

a first judgment module 1606 configured to judge whether the target drop percentage and the first duration meet a preset voltage sag judgment condition; and an execution module 1608 configured to, when judging that the target drop percentage and the first duration meet the preset voltage sag judgment condition, determine that the input voltage of the power supply circuit undergoes a voltage sag, and perform a target protection operation on the power supply circuit, wherein the target protection operation is used to control an output voltage supplied by the power supply circuit to the target apparatus to be less than or equal to a preset target voltage value when the input voltage of the power supply circuit undergoes the voltage sag, and the output voltage supplied to the target apparatus is a voltage outputted by the output end of the power factor correction stage.

Through the above device, in the process of supplying power to an apparatus by the power supply circuit, whether a voltage sag occurs may be judged in real time based on the detected drop percentage of the input voltage of the power supply circuit and the duration in which the input voltage of the power supply circuit is at the voltage value after the drop, and when the voltage sag occurs, the voltage outputted by the power supply circuit to the apparatus may be controlled at a safe voltage value, to prevent the output voltage of the power supply circuit from exceeding a working voltage range of the apparatus when the input voltage sag of the power supply circuit, which may result in damage of the apparatus. As such, the problem that the input voltage sag may result in apparatus damage may be solved, and the apparatus damage resulting from the input voltage sag may be reduced.

In an example embodiment, the first judgment module includes:
  a first judgment unit configured to judge that the target drop percentage and the first duration meet the preset voltage sag judgment condition when the first duration is less than or equal to a first preset duration and the target drop percentage is greater than or equal to a first preset percentage; and/or
  a second judgment unit configured to judge that the target drop percentage and the first duration meet the preset voltage sag judgment condition when the first duration is greater than a second preset duration and the target drop percentage is greater than or equal to a second preset percentage, wherein the second preset duration is greater than the first preset duration, and the second preset percentage is less than the first preset percentage.

In an example embodiment, the first judgment unit is configured to:
  judge that the target drop percentage and the first duration meet the preset voltage sag judgment condition when the first duration is less than or equal to the first preset duration and the target drop percentage is greater than or equal to the first preset percentage, wherein the voltage value of the input voltage is a voltage value of the alternating current inputted to the power supply circuit, a value range of the first preset duration is [half a cycle of the alternating current, a cycle of the alternating current], and a value range of the first preset percentage is [90%, 99%], [90%, 95%], or [95%, 99%].

In an example embodiment, the second judgment unit is configured to:
  judge that the target drop percentage and the first duration meet the preset voltage sag judgment condition when the first duration is greater than the second preset duration and the target drop percentage is greater than or equal to the second preset percentage, wherein the voltage value of the input voltage is a voltage value of the alternating current inputted to the power supply circuit, a value range of the second preset duration is [half a cycle of the alternating current, two cycles of the alternating current], and a value range of the second preset percentage is [20%, 40%], [20%, 30%], or [30%, 40%].

In an example embodiment, the first determination module includes:
  an acquisition unit configured to acquire a voltage difference between the current voltage value and the normal voltage value; and
  a determination unit configured to determine the target drop percentage to be equal to a ratio of the voltage difference to the normal voltage value.

In an example embodiment, the execution module includes:
  an adjustment unit configured to adjust a duty cycle of a control signal of the output voltage in the power supply circuit such that the output voltage is less than or equal to the preset target voltage value.

In an example embodiment, the adjustment unit is configured to:
  adjust the duty cycle of the control signal to be less than or equal to a target duty cycle, such that the output voltage is less than or equal to the preset target voltage value, wherein the target duty cycle is a duty cycle determined according to the target voltage value and the current voltage value.

In an example embodiment, the device further includes:
  a second determination module configured to determine the target duty cycle through the following formula:

$$D = 1 - V1/V2$$

wherein V1 represents the current voltage value, and V2 represents the target voltage value.

In an example embodiment, the adjustment unit is configured to:
  input a target pulse-width modulation signal as a driving signal to a switch device in the power supply circuit, such that the duty cycle of the control signal outputted by the switch device is adjusted to be less than or equal to the target duty cycle, wherein the target pulse-width modulation signal is used to control the switch device to switch on or off.

In an example embodiment, the device further includes:
  an acquisition module configured to acquire current values of a reverse recovery current of the power supply circuit in a plurality of cycles of the alternating current when determining that the input voltage of the power supply circuit undergoes the voltage sag, wherein the voltage value of the input voltage is a voltage value of the alternating current inputted to the power supply circuit; and
  a second judgment module configured to judge whether the current values of the reverse recovery current in the plurality of cycles meet a preset current abnormity judging condition; and
  a third determination module configured to determine that the input current of the power supply circuit is abnormal when the current values of the reverse recovery current in the plurality of cycles meet the current abnormity judging condition.

In an example embodiment, the second judgment module includes:
  a third judgment unit configured to judge whether all the current values of the reverse recovery current in successive N cycles of the alternating current are less than a first preset current value, wherein N is a positive integer greater than or equal to 2, the first preset current value is A times of a normal current value of a working current of the power supply circuit, A is a positive number greater than 1, and the plurality of cycles include the N cycles; and a fourth judgment unit configured to judge that the current values of the reverse recovery current in the plurality of cycles meet the current abnormity judging condition when not all the current values of the reverse recovery current in the N cycles are less than the first preset current value.

In an example embodiment, the second judgment module further includes:

a fifth judgment unit configured to judge whether all the current values of the reverse recovery current in successive M cycles after the N cycles are less than a second preset current value when all the current values of the reverse recovery current in the N cycles are less than the first preset current value, wherein M is a positive integer greater than or equal to 2, the second preset current value is B times of the normal current value of the working current of the power supply circuit, B is a positive number greater than 1, B is less than A, and the plurality of cycles include the N cycles and the M cycles; and a sixth judgment unit configured to judge that the current values of the reverse recovery current in the plurality of cycles meet the current abnormity judging condition when not all the current values of the reverse recovery current in the M cycles are less than the second preset current value.

In an example embodiment, the second judgment module further includes:

a seventh judgment unit configured to judge whether all the current values of the reverse recovery current in successive P cycles after the M cycles are less than a third preset current value when all the current values of the reverse recovery current in the M cycles are less than the second preset current value, wherein P is a positive integer greater than or equal to 2, the third preset current value is C times of the normal current value of the working current of the power supply circuit, C is a positive number greater than 1, C is less than B, and the plurality of cycles include the N cycles, the M cycles and the P cycles; and an eighth judgment unit configured to judge that the current values of the reverse recovery current in the plurality of cycles meet the current abnormity judging condition when not all the current values of the reverse recovery current in the P cycles are less than the third preset current value.

In an example embodiment, a value range of A is [2.5, 3.5], [2.5, 3], or [3, 3.5]; a value range of B is [1.5, 2.4], [1.5, 2], or [2, 2.4]; and a value range of C is (1, 1.4], (1, 1.1], or [1.1, 1.4].

It should be noted that each of the above modules may be realized by software or hardware. In the case of the hardware, the modules may be realized, but is not limited thereby, in the following way: all the modules are in the same processor; or the modules are separately in different processors in the form of any combinations.

An embodiment of the present disclosure further provides a non-volatile readable storage medium storing a computer program therein, wherein the computer program is configured to perform the operations in any of the above method embodiments when executed.

In an example embodiment, the non-volatile readable storage medium may include, but is not limited to various media that may store computer programs, such as a USB flash disk, a read-only memory (ROM), a random access memory (RAM), a mobile hard disk, a magnetic disk, or an optical disk.

An embodiment of the present disclosure further provides an electronic device including a memory and a processor, wherein the memory stores a computer program, and the processor is configured to run the computer program to perform the operations in any of the above method embodiments.

In an example embodiment, the electronic device may further include a transmission apparatus and an input-output apparatus, wherein the transmission apparatus is connected with the processor, and the input-output apparatus is connected with the processor.

Optional examples in this embodiment may be referred to the examples described in the above embodiments and example implementations, which are no longer repeated herein.

Obviously, those skilled in the art should understand that the modules or operations in the embodiments of the present disclosure may be implemented with a general-purpose computing device. The modules or operations may be centralized on a single computing device or distributed on a network consisting of a plurality of computing devices, may be implemented with program codes executable by the computing device, and thus may be stored in a storage device and executed by the computing device. Moreover, in some cases, the operations shown or described may be performed in an order different from the order here or may be separately produced as individual integrated circuit modules, or a plurality of the modules or operations may be produced as a single integrated circuit module. As such, the embodiments of the present disclosure are not limited to any particular combination of hardware and software.

The above embodiments are just optional embodiments of the present disclosure and are not used for limiting the embodiments of the present disclosure. For those skilled in the art, the present disclosure may have various modifications and variations. Any modification, equivalent replacement, improvement, etc. made within the principle of the embodiments of the present disclosure should be included in the protection scope of the embodiments of the present disclosure.

The invention claimed is:

1. A method of controlling a power supply circuit, wherein the method comprises:
    detecting whether a voltage value of an input voltage of the power supply circuit drops, wherein the power supply circuit is configured to supply power to a target apparatus and comprises an electromagnetic interference filter, a rectifier bridge, and a power factor correction stage, an input end of the electromagnetic interference filter is connected with an alternating current power supply that provides an alternating current for the power supply circuit, an output end of the electromagnetic interference filter is connected with an input end of the rectifier bridge, an output end of the rectifier bridge is connected with an input end of the power factor correction stage, an output end of the power factor correction stage is connected with the target apparatus, and the input voltage of the power supply circuit is a voltage of the alternating current provided by the alternating current power supply;
    when detecting that the voltage value of the input voltage drops, determining a target drop percentage of a current voltage value of the input voltage relative to a normal voltage value of the input voltage after the voltage value of the input voltage drops, and a first duration in which the voltage value of the input voltage is at the current voltage value;

judging whether the target drop percentage and the first duration meet a preset voltage sag judgment condition; and when judging that the target drop percentage and the first duration meet the preset voltage sag judgment condition, determining that the input voltage of the power supply circuit undergoes a voltage sag, and performing a target protection operation on the power supply circuit, wherein the target protection operation is used to control an output voltage supplied by the power supply circuit to the target apparatus to be less than or equal to a preset target voltage value when the input voltage of the power supply circuit undergoes the voltage sag; and the output voltage supplied to the target apparatus is a voltage outputted by the output end of the power factor correction stage;

wherein when determining that the input voltage of the power supply circuit undergoes the voltage sag, the method further comprises: acquiring current values of a reverse recovery current of the power supply circuit in a plurality of cycles of the alternating current, wherein the voltage value of the input voltage is the voltage value of the alternating current inputted to the power supply circuit; judging whether the current values of the reverse recovery current in the plurality of cycles meet a preset current abnormity judging condition; and determining that the input current of the power supply circuit is abnormal when the current values of the reverse recovery current in the plurality of cycles meet the current abnormity judging condition;

wherein judging whether the current values of the reverse recovery current in the plurality of cycles meet the preset current abnormity judging condition comprises: judging whether all the current values of the reverse recovery current in successive N cycles of the alternating current are less than a first preset current value, wherein N is a positive integer greater than or equal to 2, the first preset current value is A times of a normal current value of a working current of the power supply circuit, A is a positive number greater than 1, and the plurality of cycles comprise the N cycles; and judging that the current values of the reverse recovery current in the plurality of cycles meet the current abnormity judging condition when not all the current values of the reverse recovery current in the N cycles are less than the first preset current value;

wherein judging whether the current values of the reverse recovery current in the plurality of cycles meet the preset current abnormity judging condition further comprises: judging whether all the current values of the reverse recovery current in successive M cycles after the N cycles are less than a second preset current value when all the current values of the reverse recovery current in the N cycles are less than the first preset current value, wherein M is a positive integer greater than or equal to 2, the second preset current value is B times of the normal current value of the working current of the power supply circuit, B is a positive number greater than 1, B is less than A, and the plurality of cycles comprise the N cycles and the M cycles; and judging that the current values of the reverse recovery current in the plurality of cycles meet the current abnormity judging condition when not all the current values of the reverse recovery current in the M cycles are less than the second preset current value.

2. The method according to claim 1, wherein judging whether the target drop percentage and the first duration meet the preset voltage sag judgment condition comprises:

judging that the target drop percentage and the first duration meet the preset voltage sag judgment condition when the first duration is less than or equal to a first preset duration and the target drop percentage is greater than or equal to a first preset percentage; and/or judging that the target drop percentage and the first duration target duration meet the preset voltage sag judgment condition when the first duration is greater than a second preset duration and the target drop percentage is greater than or equal to a second preset percentage, wherein the second preset duration is greater than the first preset duration, and the second preset percentage is less than the first preset percentage.

3. The method according to claim 2, wherein judging that the target drop percentage and the first duration meet the preset voltage sag judgment condition when the first duration is less than or equal to the first preset duration and the target drop percentage is greater than or equal to the first preset percentage comprises:

judging that the target drop percentage and the first duration meet the preset voltage sag judgment condition when the first duration is less than or equal to the first preset duration and the target drop percentage is greater than or equal to the first preset percentage, wherein the voltage value of the input voltage is a voltage value of the alternating current inputted to the power supply circuit, a value range of the first preset duration is [half a cycle of the alternating current, a cycle of the alternating current], and a value range of the first preset percentage is [90%, 99%], [90%, 95%], or [95%, 99%].

4. The method according to claim 2, wherein judging that the target drop percentage and the first duration target duration meet the preset voltage sag judgment condition when the first duration is greater than the second preset duration and the target drop percentage is greater than or equal to the second preset percentage comprises:

judging that the target drop percentage and the first duration target duration meet the preset voltage sag judgment condition when the first duration is greater than the second preset duration and the target drop percentage is greater than or equal to the second preset percentage, wherein the voltage value of the input voltage is a voltage value of the alternating current inputted to the power supply circuit, a value range of the second preset duration is [a cycle of the alternating current, two cycles of the alternating current], and a value range of the second preset percentage is [20%, 40%], [20%, 30%], or [30%, 40%].

5. The method according to claim 1, wherein determining the target drop percentage of the current voltage value of the input voltage relative to the normal voltage value of the input voltage after the voltage value of the input voltage drops comprises:

acquiring a voltage difference between the current voltage value and the normal voltage value; and determining the target drop percentage to be equal to a ratio of the voltage difference to the normal voltage value.

6. The method according to claim 1, wherein performing the target protection operation on the power supply circuit comprises:

adjusting a duty cycle of a control signal of the output voltage in the power supply circuit such that the output voltage is less than or equal to the preset target voltage value.

7. The method according to claim 6, wherein adjusting the duty cycle of the control signal of the output voltage in the power supply circuit such that the output voltage is less than or equal to the preset target voltage value comprises:
adjusting the duty cycle of the control signal to be less than or equal to a target duty cycle, such that the output voltage is less than or equal to the preset target voltage value, wherein the target duty cycle is a duty cycle determined according to the target voltage value and the current voltage value.

8. The method according to claim 7, wherein the method further comprises:
determining the target duty cycle through the following formula:

$$D = 1 - V1/V2$$

wherein V1 represents the current voltage value, and V2 represents the target voltage value.

9. The method according to claim 7, wherein adjusting the duty cycle of the control signal to be less than or equal to the target duty cycle comprises:
inputting a target pulse-width modulation signal as a driving signal to a switch device in the power supply circuit, such that the duty cycle of the control signal outputted by the switch device is adjusted to be less than or equal to the target duty cycle, wherein the target pulse-width modulation signal is used to control the switch device to switch on or off.

10. The method according to claim 1, wherein judging whether the current values of the reverse recovery current in the plurality of cycles meet the preset current abnormity judging condition further comprises:
judging whether all the current values of the reverse recovery current in successive P cycles after the M cycles are less than a third preset current value when all the current values of the reverse recovery current in the M cycles are less than the second preset current value, wherein P is a positive integer greater than or equal to 2, the third preset current value is C times of the normal current value of the working current of the power supply circuit, C is a positive number greater than 1, C is less than B, and the plurality of cycles comprise the N cycles, the M cycles and the P cycles; and
judging that the current values of the reverse recovery current in the plurality of cycles meet the current abnormity judging condition when not all the current values of the reverse recovery current in the P cycles are less than the third preset current value.

11. The method according to claim 10, wherein
a value range of A is [2.5, 3.5], [2.5, 3], or [3, 3.5];
a value range of B is [1.5, 2.4], [1.5, 2], or [2, 2.4]; and
a value range of C is (1, 1.4], (1, 1.1], or [1.1, 1.4].

12. A non-volatile computer readable storage medium, storing a computer program therein, wherein the computer program, when executed by a processor, implements the following operations:
detecting whether a voltage value of an input voltage of the power supply circuit drops, wherein the power supply circuit is configured to supply power to a target apparatus and comprises an electromagnetic interference filter, a rectifier bridge, and a power factor correction stage, an input end of the electromagnetic interference filter is connected with an alternating current power supply that provides an alternating current for the power supply circuit, an output end of the electromagnetic interference filter is connected with an input end of the rectifier bridge, an output end of the rectifier bridge is connected with an input end of the power factor correction stage, an output end of the power factor correction stage is connected with the target apparatus, and the input voltage of the power supply circuit is a voltage of the alternating current provided by the alternating current power supply;
when detecting that the voltage value of the input voltage drops, determining a target drop percentage of a current voltage value of the input voltage relative to a normal voltage value of the input voltage after the voltage value of the input voltage drops, and a first duration in which the voltage value of the input voltage is at the current voltage value;
judging whether the target drop percentage and the first duration meet a preset voltage sag judgment condition; and
when judging that the target drop percentage and the first duration meet the preset voltage sag judgment condition, determining that the input voltage of the power supply circuit undergoes a voltage sag, and performing a target protection operation on the power supply circuit, wherein the target protection operation is used to control an output voltage supplied by the power supply circuit to the target apparatus to be less than or equal to a preset target voltage value when the input voltage of the power supply circuit undergoes the voltage sag; and the output voltage supplied to the target apparatus is a voltage outputted by the output end of the power factor correction stage;
wherein the computer program further implements the following operations: when determining that the input voltage of the power supply circuit undergoes the voltage sag, acquiring current values of a reverse recovery current of the power supply circuit in a plurality of cycles of the alternating current, wherein the voltage value of the input voltage is the voltage value of the alternating current inputted to the power supply circuit; judging whether the current values of the reverse recovery current in the plurality of cycles meet a preset current abnormity judging condition; and determining that the input current of the power supply circuit is abnormal when the current values of the reverse recovery current in the plurality of cycles meet the current abnormity judging condition;
wherein judging whether the current values of the reverse recovery current in the plurality of cycles meet the preset current abnormity judging condition comprises:
judging whether all the current values of the reverse recovery current in successive N cycles of the alternating current are less than a first preset current value, wherein N is a positive integer greater than or equal to 2, the first preset current value is A times of a normal current value of a working current of the power supply circuit, A is a positive number greater than 1, and the plurality of cycles comprise the N cycles; and judging that the current values of the reverse recovery current in the plurality of cycles meet the current abnormity judging condition when not all the current values of the reverse recovery current in the N cycles are less than the first preset current value;

wherein judging whether the current values of the reverse recovery current in the plurality of cycles meet the preset current abnormity judging condition further comprises: judging whether all the current values of the reverse recovery current in successive M cycles after the N cycles are less than a second preset current value when all the current values of the reverse recovery current in the N cycles are less than the first preset current value, wherein M is a positive integer greater than or equal to 2, the second preset current value is B times of the normal current value of the working current of the power supply circuit, B is a positive number greater than 1, B is less than A, and the plurality of cycles comprise the N cycles and the M cycles; and judging that the current values of the reverse recovery current in the plurality of cycles meet the current abnormity judging condition when not all the current values of the reverse recovery current in the M cycles are less than the second preset current value.

13. The computer readable storage medium according to claim 12, wherein judging whether the target drop percentage and the first duration meet the preset voltage sag judgment condition comprises:
judging that the target drop percentage and the first duration meet the preset voltage sag judgment condition when the first duration is less than or equal to a first preset duration and the target drop percentage is greater than or equal to a first preset percentage; and/or
judging that the target drop percentage and the first duration meet the preset voltage sag judgment condition when the first duration is greater than a second preset duration and the target drop percentage is greater than or equal to a second preset percentage, wherein the second preset duration is greater than the first preset duration, and the second preset percentage is less than the first preset percentage.

14. The computer readable storage medium according to claim 13, wherein judging that the target drop percentage and the first duration meet the preset voltage sag judgment condition when the first duration is less than or equal to the first preset duration and the target drop percentage is greater than or equal to the first preset percentage comprises:
judging that the target drop percentage and the first duration meet the preset voltage sag judgment condition when the first duration is less than or equal to the first preset duration and the target drop percentage is greater than or equal to the first preset percentage, wherein the voltage value of the input voltage is a voltage value of the alternating current inputted to the power supply circuit, a value range of the first preset duration is [half a cycle of the alternating current, a cycle of the alternating current], and a value range of the first preset percentage is [90%, 99%], [90%, 95%], or [95%, 99%].

15. The computer readable storage medium according to claim 13, wherein judging that the target drop percentage and the first duration meet the preset voltage sag judgment condition when the first duration is greater than the second preset duration and the target drop percentage is greater than or equal to the second preset percentage comprises:
judging that the target drop percentage and the first duration meet the preset voltage sag judgment condition when the first duration is greater than the second preset duration and the target drop percentage is greater than or equal to the second preset percentage, wherein the voltage value of the input voltage is a voltage value of the alternating current inputted to the power supply circuit, a value range of the second preset duration is [a cycle of the alternating current, two cycles of the alternating current], and a value range of the second preset percentage is [20%, 40%], [20%, 30%], or [30%, 40%].

16. An electronic device comprising a memory, a processor, and a computer program stored on the memory and runnable on the processor, wherein the processor implements the following operations when executing the computer program:
detecting whether a voltage value of an input voltage of the power supply circuit drops, wherein the power supply circuit is configured to supply power to a target apparatus and comprises an electromagnetic interference filter, a rectifier bridge, and a power factor correction stage, an input end of the electromagnetic interference filter is connected with an alternating current power supply that provides an alternating current for the power supply circuit, an output end of the electromagnetic interference filter is connected with an input end of the rectifier bridge, an output end of the rectifier bridge is connected with an input end of the power factor correction stage, an output end of the power factor correction stage is connected with the target apparatus, and the input voltage of the power supply circuit is a voltage of the alternating current provided by the alternating current power supply;
when detecting that the voltage value of the input voltage drops, determining a target drop percentage of a current voltage value of the input voltage relative to a normal voltage value of the input voltage after the voltage value of the input voltage drops, and a first duration in which the voltage value of the input voltage is at the current voltage value;
judging whether the target drop percentage and the first duration meet a preset voltage sag judgment condition; and
when judging that the target drop percentage and the first duration meet the preset voltage sag judgment condition, determining that the input voltage of the power supply circuit undergoes a voltage sag, and performing a target protection operation on the power supply circuit, wherein the target protection operation is used to control an output voltage supplied by the power supply circuit to the target apparatus to be less than or equal to a preset target voltage value when the input voltage of the power supply circuit undergoes the voltage sag; and the output voltage supplied to the target apparatus is a voltage outputted by the output end of the power factor correction stage;
wherein the processor further implements the following operations: when determining that the input voltage of the power supply circuit undergoes the voltage sag, acquiring current values of a reverse recovery current of the power supply circuit in a plurality of cycles of the alternating current, wherein the voltage value of the input voltage is the voltage value of the alternating current inputted to the power supply circuit; judging whether the current values of the reverse recovery current in the plurality of cycles meet a preset current abnormity judging condition; and determining that the input current of the power supply circuit is abnormal when the current values of the reverse recovery current in the plurality of cycles meet the current abnormity judging condition;
wherein judging whether the current values of the reverse recovery current in the plurality of cycles meet the preset current abnormity judging condition comprises: judging whether all the current values of the reverse recovery current in successive N cycles of the alternating current are less than a first preset current value, wherein N is a positive integer greater than or equal to 2, the first preset current value is A times of a normal current value of a working current of the power supply circuit, A is a positive number greater than 1, and the plurality of cycles comprise the N cycles; and judging that the current values of the reverse recovery current in the plurality of cycles meet the current abnormity judging condition when not all the current values of the reverse recovery current in the N cycles are less than the first preset current value;

wherein judging whether the current values of the reverse recovery current in the plurality of cycles meet the preset current abnormity judging condition further comprises: judging whether all the current values of the reverse recovery current in successive M cycles after the N cycles are less than a second preset current value when all the current values of the reverse recovery current in the N cycles are less than the first preset current value, wherein M is a positive integer greater than or equal to 2, the second preset current value is B times of the normal current value of the working current of the power supply circuit, B is a positive number greater than 1, B is less than A, and the plurality of cycles comprise the N cycles and the M cycles; and judging that the current values of the reverse recovery current in the plurality of cycles meet the current abnormity judging condition when not all the current values of the reverse recovery current in the M cycles are less than the second preset current value.

17. The electronic device according to claim 16, wherein determining the target drop percentage of the current voltage value of the input voltage relative to the normal voltage value of the input voltage after the voltage value of the input voltage drops comprises:

acquiring a voltage difference between the current voltage value and the normal voltage value; and determining the target drop percentage to be equal to a ratio of the voltage difference to the normal voltage value.

18. The electronic device according to claim 16, wherein performing the target protection operation on the power supply circuit comprises:

adjusting a duty cycle of a control signal of the output voltage in the power supply circuit such that the output voltage is less than or equal to the preset target voltage value.

19. The electronic device according to claim 18, wherein adjusting the duty cycle of the control signal of the output voltage in the power supply circuit such that the output voltage is less than or equal to the preset target voltage value comprises:

adjusting the duty cycle of the control signal to be less than or equal to a target duty cycle, such that the output voltage is less than or equal to the preset target voltage value, wherein the target duty cycle is a duty cycle determined according to the target voltage value and the current voltage value.

20. The electronic device according to claim 19, wherein the computer program further implements the following operations:

determining the target duty cycle through the following formula:

$$D = 1 - V1/V2$$

wherein V1 represents the current voltage value, and V2 represents the target voltage value.